(12) United States Patent
Dalland et al.

(10) Patent No.: US 12,110,967 B2
(45) Date of Patent: Oct. 8, 2024

(54) DYNAMIC AXIAL SEAL SYSTEMS AND METHODS

(71) Applicant: OneSubsea IP UK Limited, London (GB)

(72) Inventors: Jørgen Myrmael Dalland, Fusa (NO); Anders Brunvold, Blomsterdalen (NO); Svein Berge Litland, Hylkje (NO)

(73) Assignee: ONESUBSEA IP UK LIMITED, London (GB)

( * ) Notice: Subject to any disclaimer, the term of this patent is extended or adjusted under 35 U.S.C. 154(b) by 0 days.

(21) Appl. No.: 18/148,740

(22) Filed: Dec. 30, 2022

(65) Prior Publication Data

US 2024/0218931 A1 Jul. 4, 2024

(51) Int. Cl.
*F16J 15/3284* (2016.01)

(52) U.S. Cl.
CPC .................................. *F16J 15/3284* (2013.01)

(58) Field of Classification Search
CPC ...... F16J 15/3284; F16J 15/34; F16J 15/3464; F16J 15/348; F16J 15/38
See application file for complete search history.

(56) References Cited

U.S. PATENT DOCUMENTS

| | | | |
|---|---|---|---|
| 3,685,839 A * | 8/1972 | Frei | F16J 15/346 |
| | | | 277/411 |
| 3,841,642 A | 10/1974 | Kirker, Jr. | |
| 4,095,806 A * | 6/1978 | Dempsey | F16J 15/3464 |
| | | | 277/361 |
| 4,538,820 A * | 9/1985 | Duffee | F16J 15/3464 |
| | | | 277/398 |
| 4,752,077 A | 6/1988 | Hoffelner | |
| 6,601,854 B2 * | 8/2003 | Auber | F16J 15/3464 |
| | | | 277/377 |
| 2004/0227297 A1 * | 11/2004 | Azibert | F16J 15/3448 |
| | | | 277/361 |
| 2007/0235945 A1 | 10/2007 | Casucci et al. | |
| 2014/0103144 A1 * | 4/2014 | Haralson | F16J 15/34 |
| | | | 277/300 |
| 2018/0073639 A1 * | 3/2018 | Webster | F16J 15/164 |

FOREIGN PATENT DOCUMENTS

| | | |
|---|---|---|
| DE | 8006044 U1 | 6/1980 |
| EP | 1426561 | 6/2004 |
| WO | WO-2017125227 A1 * 7/2017 | .......... F16J 15/3404 |

OTHER PUBLICATIONS

Extended European Search Report issued in European Patent Appl. No. 23220642.5 on May 23, 2024; 9 pages.

\* cited by examiner

*Primary Examiner* — Gilbert Y Lee
(74) *Attorney, Agent, or Firm* — Jeffrey D. Frantz

(57) ABSTRACT

A fluid processing machine that operates on a process fluid may include a frame that structurally supports at least a portion of the fluid processing machine and a shaft that operatively rotates about an axis and relative to the frame. The shaft may include a projection in a radial direction relative to the axis that is operationally contacted by a sealing armature that has an axial degree of freedom relative to the axis. Additionally, the fluid processing machine may include a dynamic rotational seal between the projection and the sealing armature and a dynamic axial seal between the sealing armature and the frame. The dynamic axial seal may include one or more metallic seals that seal between the sealing armature and the frame circumferentially about the axis.

20 Claims, 24 Drawing Sheets

DYNAMIC AXIAL SEAL SYSTEMS AND METHODS

BACKGROUND

The present disclosure generally relates to sealing systems and methods for pumps and/or compressors of a fluid processing system. More particularly, an axial dynamic seal may augment a rotational seal for rotating elements.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Different industries such as oil and gas, aerospace, nuclear, automotive, and/or general infrastructure utilize pumps, compressors, and other machines that process a fluid therethrough. Additionally, seals within such fluid processing systems may provide pressure and/or fluid barriers between sections thereof. For example, subsea pumps and compressors have components that move rotationally and/or axially that may be in contact with one or more fluids, such as process fluids (e.g., the fluid being pumped or compressed) and/or lubricating/barrier fluids. In some scenarios, seals are used to separate the barrier fluid from the process fluid and/or to seal the barrier fluid or process fluid within sections of the pump or compressor. Furthermore, dynamic seals such as elastomeric seals may provide sealing for components that actuate (e.g., rotationally or axially). However, in some scenarios, the large transient pressures and/or the use of certain fluids may reduce the effectiveness and/or longevity of such seals. As such, improved dynamic seals would be useful in such applications.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a fluid processing machine that operates on a process fluid may include a frame that structurally supports at least a portion of the fluid processing machine and a shaft that operatively rotates about an axis and relative to the frame. The shaft may include a projection in a radial direction relative to the axis that is operationally contacted by a sealing armature that has an axial degree of freedom relative to the axis. Additionally, the fluid processing machine may include a dynamic rotational seal between the projection and the sealing armature and a dynamic axial seal between the sealing armature and the frame. The dynamic axial seal may include one or more metallic seals that seal between the sealing armature and the frame circumferentially about the axis.

In another embodiment, a method may include rotating a shaft of a fluid processing machine about an axis and sealing, via a dynamic rotational seal, between the shaft and a sealing armature. The sealing armature may not rotate with the shaft and has a degree of freedom in an axial direction relative to the axis. Additionally, the method may include sealing, via a dynamic axial seal, between the sealing armature and a fixed component of the fluid processing machine relative to the shaft and the sealing armature. Moreover, the dynamic axial seal may include one or more metallic sealing rings.

In another embodiment, a seal assembly may include a sealing armature having a single degree of freedom in an axial direction relative to an axis and a first mating surface of the sealing armature that forms a dynamic rotational seal with a second mating surface of a shaft that operationally rotates about the axis. Additionally, the seal assembly may include one or more metallic seals that form a dynamic axial seal between the sealing armature and a frame that is stationary relative to the sealing armature and the shaft.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
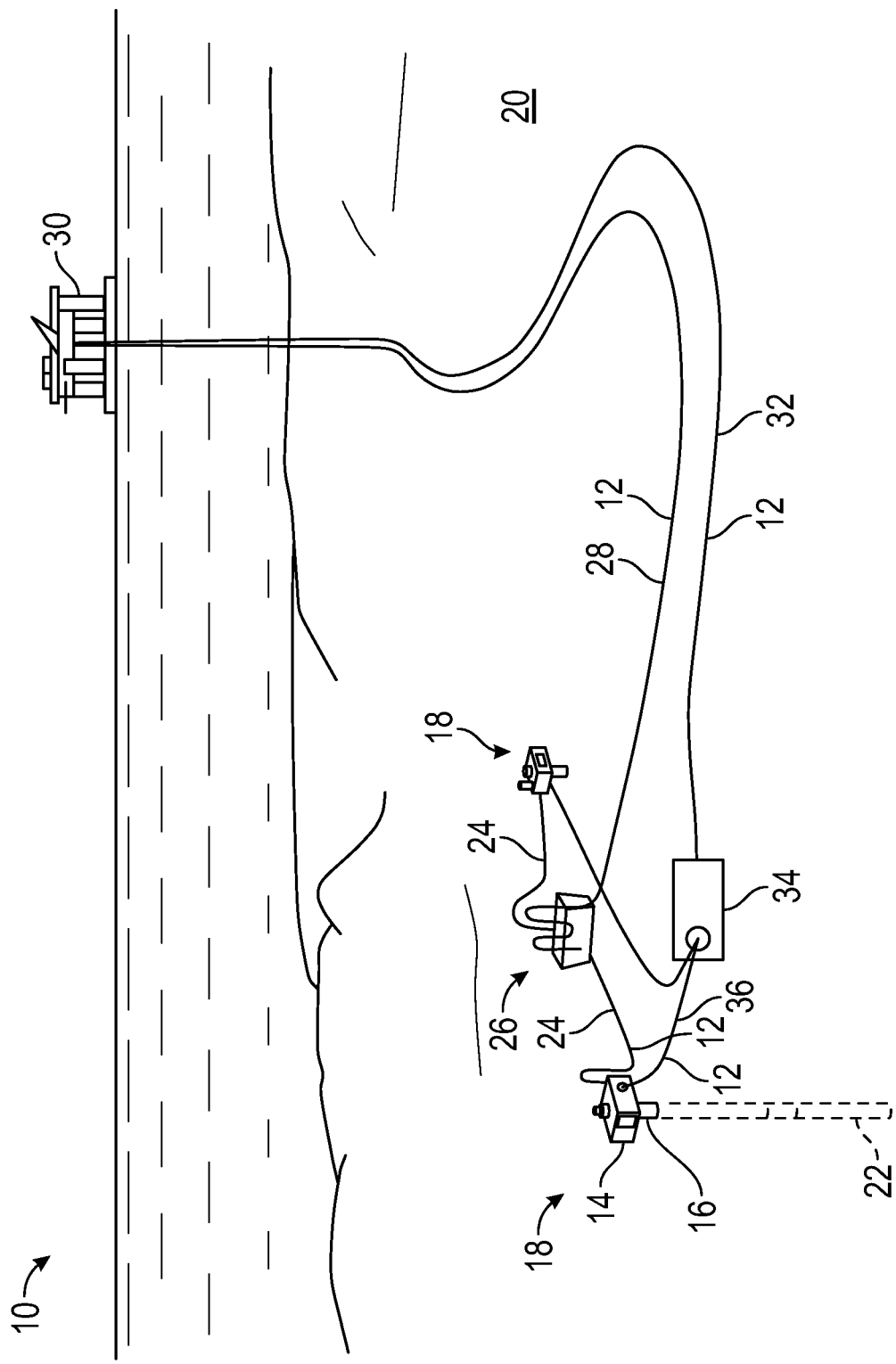
FIG. 1 a schematic view of a subsea production system having one components, such as subsea pumps, using a seal assembly, according to an embodiment of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening components between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Hydrocarbon fluids, such as oil and natural gas, may be obtained from subterranean or subsea geologic formations, often referred to as reservoirs, by drilling one or more wells that penetrate the hydrocarbon-bearing geologic formation. In general, various types of infrastructure may be utilized in such an endeavor, such as fluid handling components that operate to transfer fluids from one location to another. In subsea applications, such infrastructure may be positioned underwater and/or along a sea floor to aid in retrieving the hydrocarbon fluids and/or injecting carbon dioxide ($CO_2$) into the reservoir as part of a carbon capture and sequestration (CCS) process. The fluid handling components may be utilized, for example, to transfer hydrocarbons from the reservoir to a desired location, transfer fluids used in maintaining or operating the infrastructure to respective operating locations, and/or transfer carbon dioxide into the reservoir. For example, pumps/compressors (discussed as pumps herein) may be utilized to increase the pressure of a process fluid and/or to motivate a flow of the process fluid from one location to another. Such process fluids may include but are not limited to crude oil, hydrocarbon gases (e.g., methane, ethane, propane, butane, etc.), sea water, fresh water, barrier fluids (e.g., lubricating fluids), and/or carbon dioxide (e.g., in a gas, liquid, or supercritical state).

In general, pumps and other fluid handling components include various seals to provide pressure and/or fluid barriers between sections thereof. For example, subsea pumps have components that move rotationally and/or axially that may be in contact with one or more fluids such as the process fluid barrier fluids. In some scenarios, seals are used to separate the barrier fluid from the process fluid and/or to seal the barrier fluid or process fluid within sections of the pump or compressor and/or from the environment. Furthermore, dynamic seals provide sealing for components that actuate or otherwise move (e.g., rotationally or axially) during operation. For example, in some embodiments, a motor may include a rotating shaft that drives one or more stages (e.g., impellers, blades, etc.) of a pump. As should be appreciated, the pump/compressor may be of any suitable type such as an axial compressor, a centrifugal compressor, an axi-centrifugal compressor, a mixed-flow compressor, an axial-flow pump, etc.

In some scenarios, it may be desirable to seal a rotating (e.g., shaft of the motor, compressor section of the pump, etc.) or axially oscillating component against a stationary component (e.g., frame, housing, stator, etc.). Such a seal may create a barrier between the process fluid and a barrier fluid of the motor and/or pump. For example, in some embodiments, a dynamic rotational seal is made by axially tensioning a sealing armature against a protrusion of a rotating shaft of the pump. The sealing armature and protrusion may have mating seals that contact one another and form a seal, even though the shaft is rotating and the sealing armature is not rotating. However, in tensioning the sealing armature against the shaft, the sealing armature may move axially to maintain the rotational seal. As such, a dynamic axial seal may be formed between the stationary component of the pump/motor (e.g., frame or housing) and the sealing armature.

In some scenarios, an elastomeric seal may be used as the dynamic axial seal. However, depending on implementation (e.g., process fluid type, pressure transients, etc.), such elastomeric seals may have reduced effectiveness and/or longevity. For example, during carbon capture and sequestration (CCS) processes, the dynamic axial seal may be subject to large pressure transients (e.g., changes in pressure greater than 50 psi, greater than 100 psi, greater than 500 psi, etc. within a minute, within 10 seconds, within 5 seconds, or within 1 second) of carbon dioxide that may cause cracking or other damage to the elastomeric seals. As such, in some embodiments, the dynamic axial seal may include one or more metallic seals alone or in conjunction with elastomeric and/or thermoplastic seals. For example, when used in conjunction with an elastomeric seal, the metallic seals may reduce the changes in pressure felt by the elastomeric seal such that damage to the elastomeric seal is reduced or eliminated. The metallic seal may be a continuous ring, a split ring, or spiral, and may be biased against the stationary component or the sealing armature. Moreover, in some embodiments, multiple metallic seals may be used with one or more tensioned against the stationary component and one or more tensioned against the sealing armature. Additionally, the interface between a metallic seal and the sealing armature or between the stationary component and the metallic seal may be smooth, keyed, or of any suitable shape to improve sealing and/or stability. For example, in some embodiments, the metallic seal may resemble that of a piston ring of a reciprocating engine. Moreover, the arrangement of multiple metallic seals between the sealing armature and stationary component may be straight or staggered, as discussed further below.

With the foregoing in mind, FIG. 1 is a schematic view of a subsea production system 10 that utilizes one or more pumps/compressors and/or other fluid processing machines having sealing assemblies therein, according to an embodiment of the present disclosure. In general, the subsea production system 10 may include electrical cables 12 running to a subsea tree 14 that is coupled to a wellhead 16. The subsea tree 14, wellhead 16, and/or additional components form a subsea station 18 that extracts formation fluid, such as oil and/or natural gas, from a reservoir below the sea floor 20 through the well 22. In some embodiments, the subsea production system 10 may include multiple subsea stations 18 that extract formation fluid from respective wells 22. After passing through the subsea tree 14, the formation fluid flows through jumper cables 24 to a pipeline manifold 26. The pipeline manifold 26 may connect to one or more flowlines 28 to enable the formation fluid to flow from the wells 22 to a surface platform 30. In some embodiments, the surface platform 30 may include a floating production, storage, and offloading unit (FPSO) or a shore-based facility. In addition to flowlines 28 that carry the formation fluid away from the wells 22, the subsea production system 10 may include lines or conduits 32 that supply fluids, as well as carry control and data lines to the subsea equipment. These conduits 32 connect to a distribution module 34, which in turn couples to the subsea stations 18 via supply lines. In some scenarios, the platform 30 may be located a significant distance (e.g., greater than 100 m, greater than 1 km, greater than 10 km, or greater than 60 km) away from the wells 22. The reservoir fluids and operational fluids (e.g., barrier fluids) may flow between the wells 22 and the platform 30 via one or more pumps disposed, for example, at the surface platform 30, subsea trees 14, distribution module 34, pipeline manifold 26, etc. Moreover, after extracting hydrocarbons from the reservoir, pumps may be utilized to pump carbon dioxide back into the reservoir as part of a carbon capture and sequestration (CCS) process.

Figure 2:
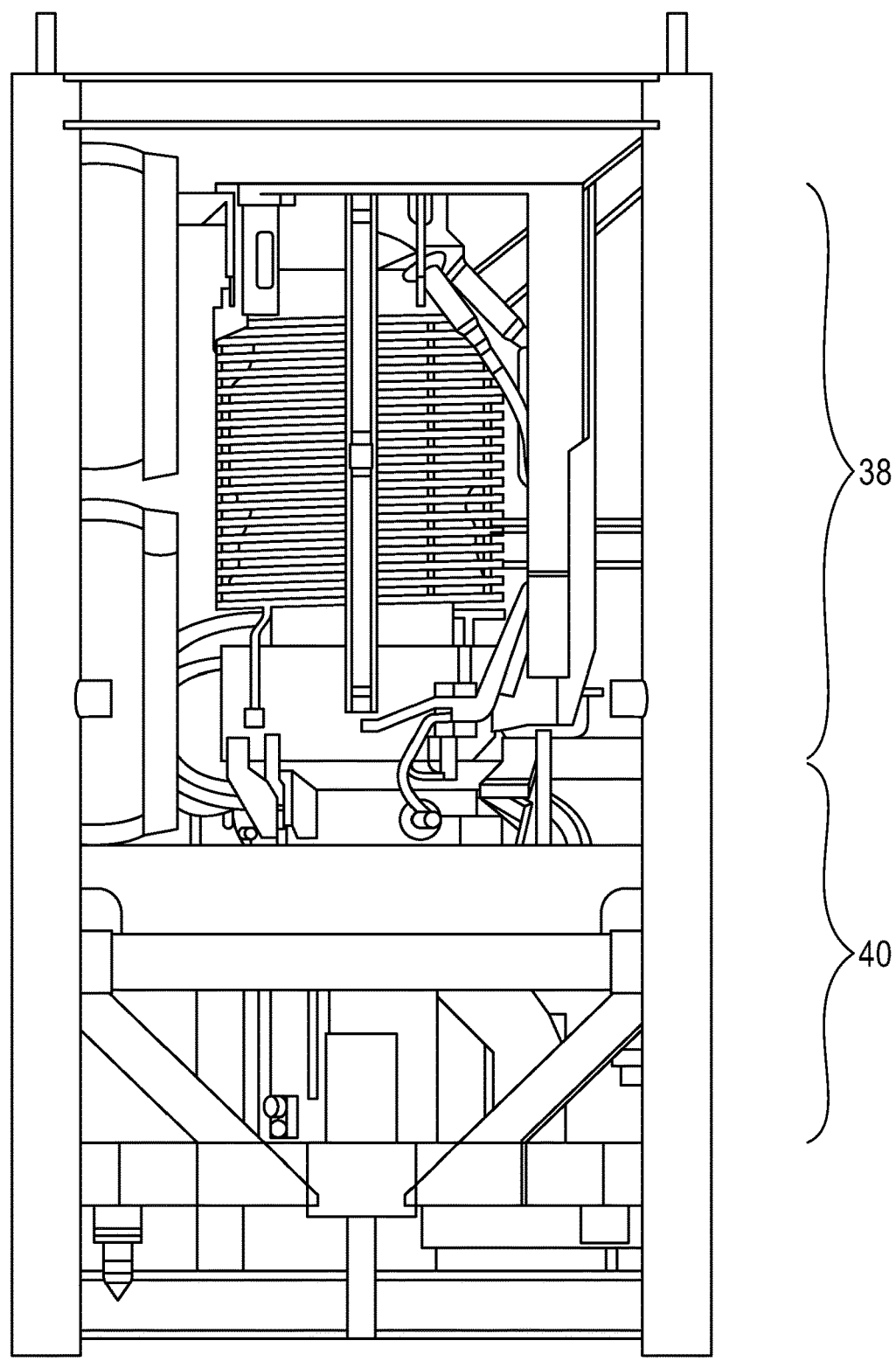
FIG. 2 is a schematic view of a subsea pump that pressurizes and/or motivates the flow of a process fluid, wherein the subsea pump includes a seal assembly at an interface for rotating and axial movement, according to an embodiment of the present disclosure.

To help illustrate, FIG. 2 is a schematic view of a pump 36 (e.g., subsea pump) that utilizes one or more seal assemblies therein while pressurizing and/or motivating the flow of a process fluid such as oil, natural gas, carbon dioxide, etc. In general, the pump 36 may include a motor section 38 that drives a pump section 40. Although discussed herein as relating to oil and gas technologies, as should be appreciated, aspects of the present disclosure may be applicable to pumps used in many different fields such as aerospace, nuclear, automotive, and/or civil infrastructure. Furthermore, while discussed herein as a pump 36 having a pump section 40, as used herein, the term pump 36 may also include compressors, and embodiments, of the seal assembly may further be utilized in any suitable fluid processing machine.

Figure 3:
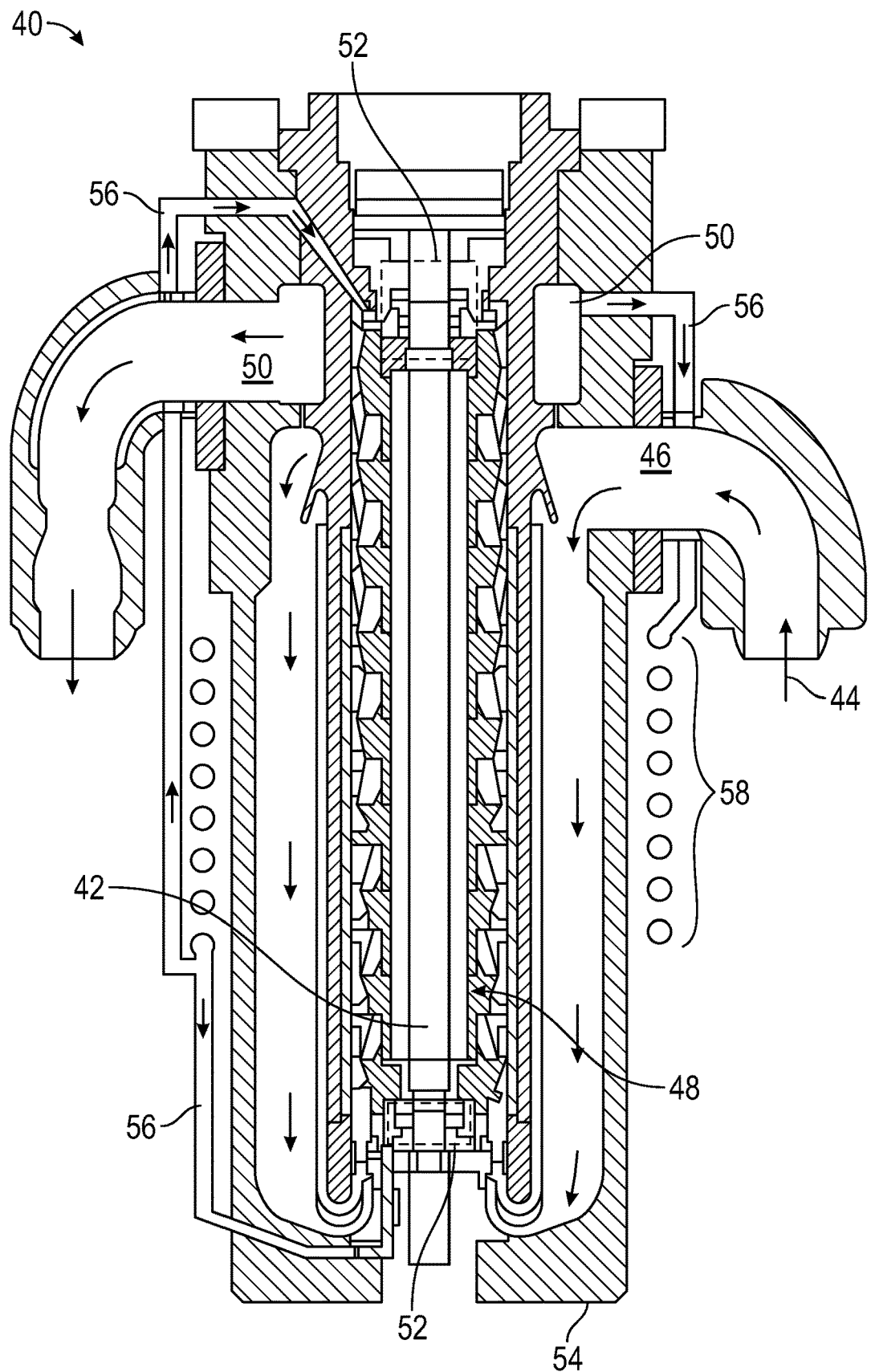
FIG. 3 is a schematic cutaway view of a pump section of the subsea pump of FIG. 2 including a shaft, according to an embodiment of the present disclosure.

In general, the pump section 40 may be driven via a shaft 42, as shown in FIG. 3, which may be a shaft of the motor section 38 or a separate shaft mechanically coupled to the motor section 38. The pump section 40 may receive a process fluid 44 via an intake 46, pressurize the process fluid 44 via one or more pump stages 48, and output the pressurized process fluid 44 via an outlet 50. The shaft 42, which may be the same shaft as from the motor section 38 or a separate shaft, rotates to operate the pump stages 48 and pressurize the process fluid 44. Moreover, the shaft may be hollow or solid depending on implementation. In some scenarios, it may be desired (e.g., for stability, separation, etc.) to form a seal between the shaft 42 and the frame 54 or other stationary component. For example, at one or more shaft interfaces, a dynamic seal (e.g., via seal assembly 52) is formed between the rotating shaft 42 and the stationary frame 54 of the pump section 40. As discussed herein, the seal assembly 52 may include a dynamic rotational seal formed between a sealing armature and the shaft 42, whereby the shaft 42 rotates and the sealing armature does not rotate, and a dynamic axial seal formed between the sealing armature and the frame 54 or other stationary component of the pump 36.

To help cool the dynamic rotational seal, dynamic axial seal, shaft 42, or other components (e.g., at the shaft interfaces) in some embodiments, a portion of the process fluid 44 may be extracted (e.g., via coolant conduits 56) and directed through one or more cooling coils 58. In subsea applications, for example, the cooling coils 58 may act as a heat exchanger cooled via seawater. As should be appreciated, while the cooling coils 58 are shown as an example, any suitable heat exchanger may be utilized to cool the process fluid within the cooling conduit 56. The cooled process fluid 44 may then be directed to the shaft interfaces to maintain a suitable temperature for the dynamic rotational seal.

Figure 4:
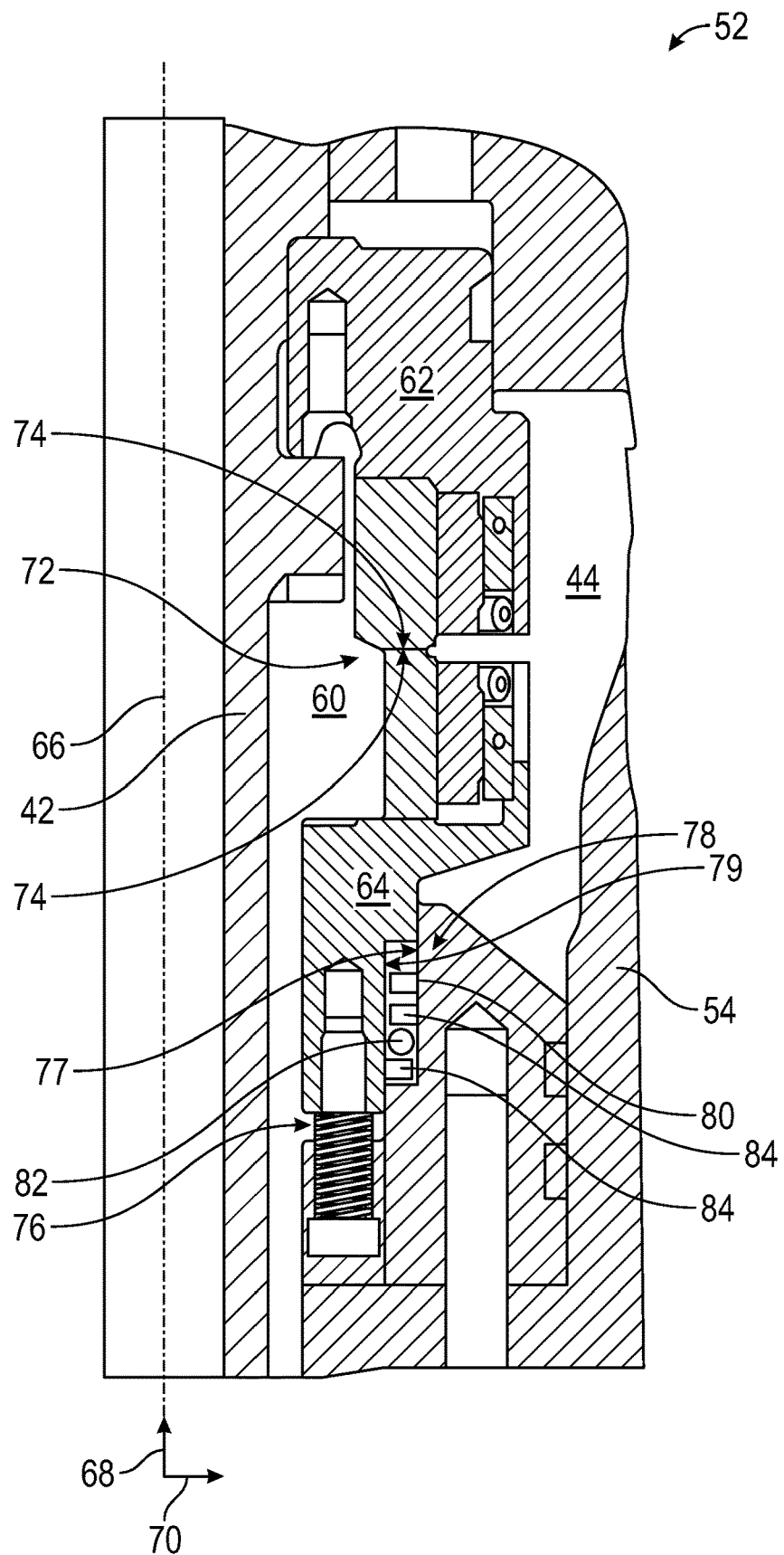
FIG. 4 is a schematic cutaway view of a shaft interface of the shaft of FIG. 3, according to an embodiment of the present disclosure.

To help illustrate, FIG. 4 is a schematic cross-sectional view of a portion of the shaft interface including the seal assembly 52. While only a portion of the seal assembly 52 is shown, as should be appreciated, the seal assembly 52 may be substantially the same circumferentially around the shaft 42. In other words, the seal assembly 52 may be an annular seal assembly 52 surrounding the shaft 42. Furthermore, in some embodiments, the shaft 42 may be surrounded, at least partially, by a barrier fluid 60, and the seal assembly 52 may provide sealing between the barrier fluid 60 and the process fluid 44, the frame 54, or other components/fluids of the pump 36. The barrier fluid 60 may lubricate and/or cool the shaft 42 and/or other moving components of the pump 36. As should be appreciated, while shown as sealing on the exterior of the shaft 42 and between the barrier fluid 60 and process fluid 44, in some embodiments, the process fluid 44 and barrier fluids 60 may be reversed and/or the shaft 42 may be hollow and rotate around a stationary component within the shaft 42, with the seal assembly 52 therebetween.

In the illustrated embodiment, the rotating shaft 42 may have a projection 62 that seals against a sealing armature 64 that does not rotate and is coupled to the frame 54. As should be appreciated, the shaft 42 may rotate about an axis 66 forming an axial direction 68, perpendicular to a radial direction 70. Moreover, while mechanically coupled to the frame 54, the sealing armature 64 may have a degree of freedom in the axial direction 68, for example, to maintain pressure on the dynamic rotational seal 72. The dynamic rotational seal 72 (e.g., annular seal disposed about the axis 66) is formed (e.g., in the axial direction 68) between mating surfaces 74 (e.g., annular surfaces) of the projection 62 and the sealing armature 64. The mating surfaces 74 are generally axially facing surfaces, wherein the mating surfaces 74 may extend in a plane perpendicular or normal to the axis 66. In some embodiments, the mating surfaces 74 may be inclined or angled relative to the axis 66, such as conical mating surfaces. In operation the dynamic rotational seal 72 blocks (e.g., reduces or eliminates) fluid leakage between the mating surfaces 74, which experience relative rotational movement about the axis 66. Pressure between the mating surfaces 74 of the dynamic rotation seal 72 may be maintained by a biasing element 76 (e.g., spring) that biases the sealing armature 64 against the projection 62. In some embodiments, the dynamic rotational seal 72 may assist in retaining the barrier fluid 60 and/or keeping process fluid 44 (e.g., the cooled process fluid from the conduit 56) away from the shaft 42. Moreover, in some embodiments, the barrier fluid 60 may be maintained at a pressure higher than the process fluid 44, such that leakage between the mating surfaces 74 of the dynamic rotational seal 72 is away from the shaft 42.

As discussed above, the sealing armature 64 is biased (e.g., in the axial direction 68) toward the projection 62 of the shaft 42 to increase/maintain the sealing effect of the dynamic rotational seal 72. As such, the sealing armature 64 may be articulable (e.g., having a degree of freedom) in the axial direction 68 at least a small amount (e.g., less than 10 cm, less than 5 cm, less than 3 cm, less than 2 cm, or less than 1 cm). As such, a dynamic axial seal 78 (e.g., e.g., annular seal disposed about the axis 66) may be disposed between the sealing armature 64 and the frame 54 or other stationary component along an annular-axial interface to reduce or eliminate leakage around the sealing armature 64. The annular-axial interface of the dynamic axial seal 78 may be defined by an inner annular surface 77 of a stationary component (e.g., frame 54) and an outer annular surface 79 of the sealing armature 64, wherein the dynamic axial seal 78 blocks fluid leakage while enabling relative axial movement between the inner annular surface 77 and outer annular surface 79. In some embodiments, the dynamic axial seal 78 may include one or more metallic seals 80, one or more elastomeric seals 82, and/or one or more thermoplastic seals 84 (two shown).

Figure 5:
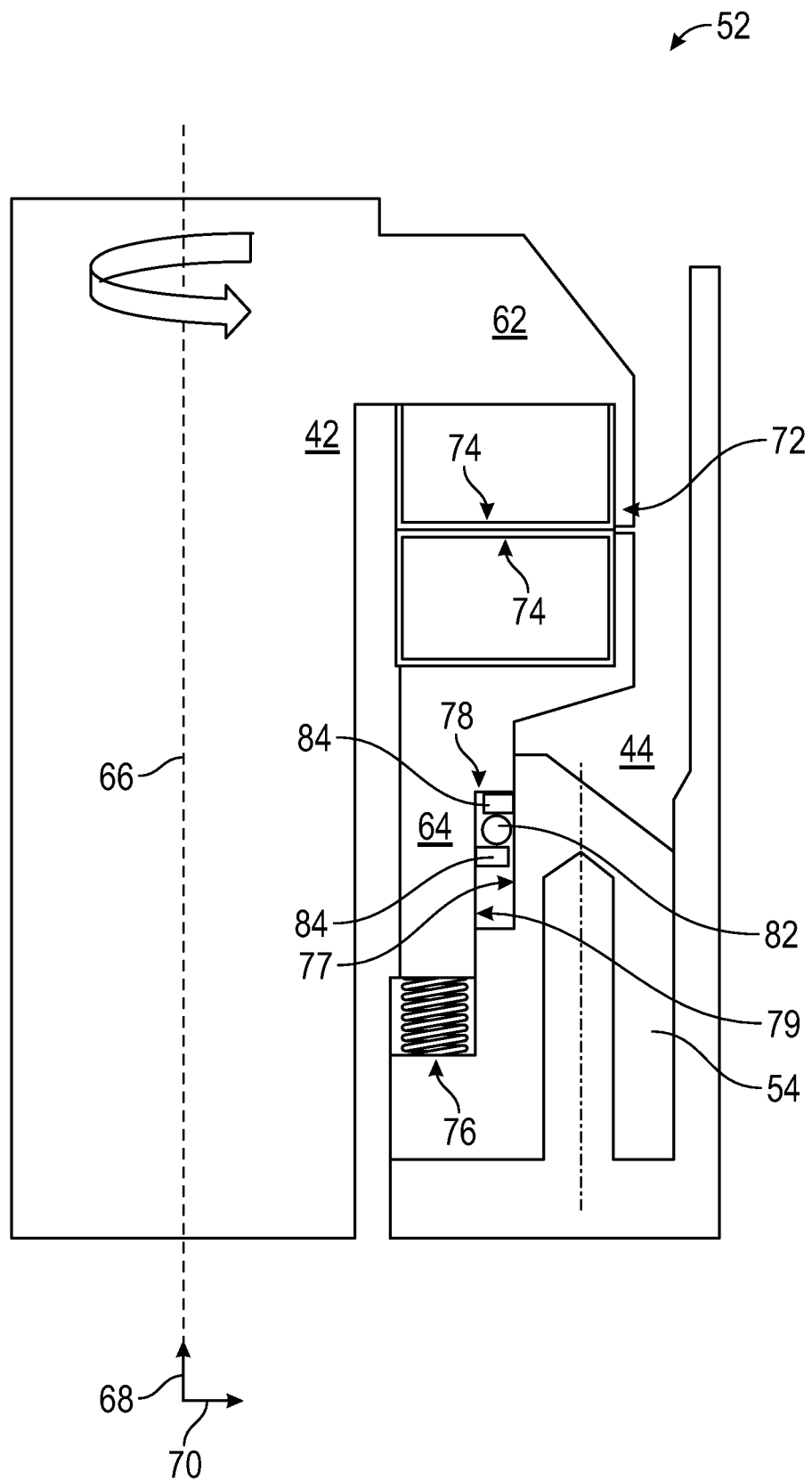
FIG. 5 is a schematic cutaway view of a shaft interface including a thermoplastic seal on either side of an elastomeric seal, according to an embodiment of the present disclosure.

FIG. 5 is a schematic view of the seal assembly 52 including a thermoplastic seal 84 on axially opposite sides of an elastomeric seal 82. However, in some scenarios (e.g., depending on process fluid type, pressure transients, etc.), elastomeric seals 82 may have reduced effectiveness and/or longevity. For example, during carbon capture and sequestration (CCS) processes, the dynamic axial seal 78 may be subject to large pressure transients (e.g., changes in pressure greater than 50 psi, greater than 100 psi, greater than 500 psi, etc. within a minute, within 10 seconds, within 5 seconds, or within 1 second) of carbon dioxide that may cause cracking or other damage to the elastomeric seals 82. As should be appreciated, the pressure transients may occur on either or both axial sides of the sealing elements. For example, pressure transients may occur in the pressure of the process fluid 44 and/or the barrier fluid 60. Moreover, carbon dioxide itself or other process fluids 44 may reduce the efficacy of such elastomeric seals 82.

Figure 6:
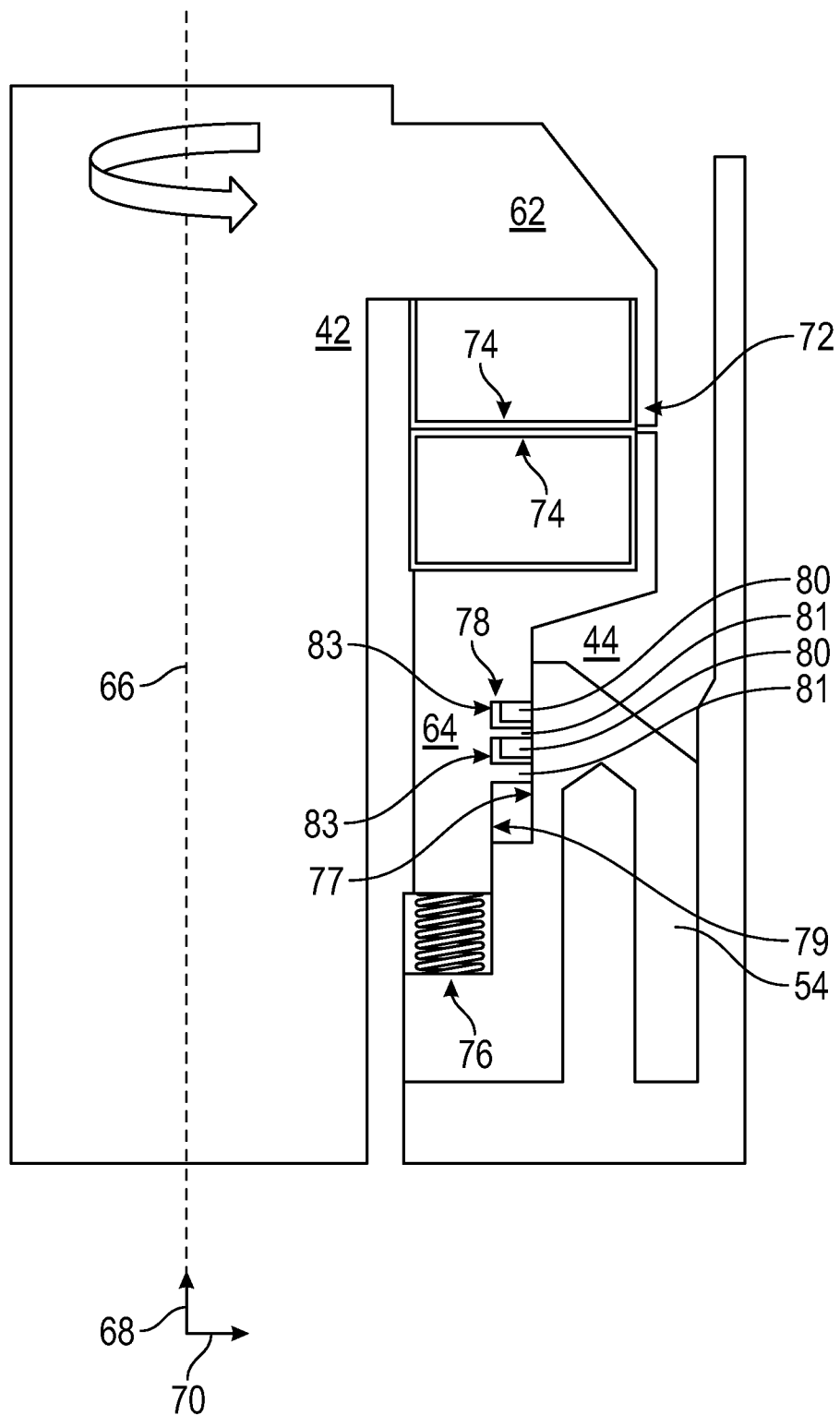
FIG. 6 is a schematic cutaway view of a shaft interface including two metallic seals, according to an embodiment of the present disclosure.

As such, in some embodiments, the dynamic axial seal 78 may include one or more metallic seals 80 alone or in conjunction with the elastomeric seal 82 and/or thermoplastic seals 84, as shown in FIG. 6. As should be appreciated, the metallic seals 80 may be of any suitable metallic material, such as but not limited to steel, iron, copper, aluminum, nickel, alloys that include such metallic materials, etc. Moreover, in some embodiments, the sealing armature 64 and/or frame 54 may be metallic such that the metallic seal 80 forms a metal-to-metal seal with the sealing armature 64 and/or frame 54 or other stationary component. Furthermore, in some embodiments, the metallic seals 80, the sealing armature 64 and/or the frame 54 may include coatings (e.g., ceramic coatings, per/polyfluoroalkyl substances (PFASs) such as polytetrafluoroethylene (PTFE), etc.) and/or surface textures (e.g., honing etching, etc.). For example, the inner annular surface 77 of the frame 54 and/or the outer annular surface 79 of the sealing armature 64 may be laser treated with a surface texture to enhance sealing, lubrication, and/or to reduce wear.

Additionally, in some embodiments, the sealing armature 64 and/or frame 54 or other stationary component may include extrusions 81 (e.g., annular extrusions, lips, shoulders, projections, etc.) that form grooves 83 (e.g., annular grooves, pockets, recesses, notches, etc.) in which the metallic seals 80, elastomeric seals 82, and/or thermoplastic seals 84 may be disposed. For example, the outer annular surface 79 of the sealing armature 64 and/or the inner annular surface 77 of the frame 54 may include such extrusions 81 and grooves 83. The grooves 83 may assist in maintaining placement of and/or assist in sealing against the metallic seals 80, elastomeric seals 82, and/or thermoplastic seals 84. As should be appreciated, instead of providing extrusions 81, notches may be cut into the outer annular surface 79 of the sealing armature 64 and/or the inner annular surface 77 of the frame 54 to form the grooves 83. Furthermore, although shown with rectangular cross-sections, the grooves 83 may be formed with any suitable cross-section and may include angled or rounded features to interface with matching features of the metallic seals 80, elastomeric seals 82, and/or thermoplastic seals 84.

Figure 7:
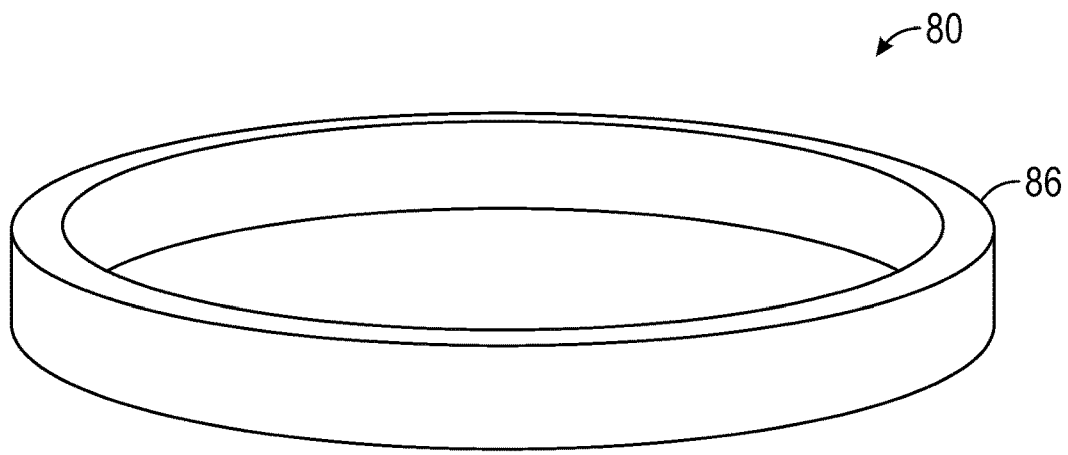
FIG. 7 is a perspective view of an example embodiment of a metallic seal in the form of a continuous ring, according to an embodiment of the present disclosure.
Figure 8:
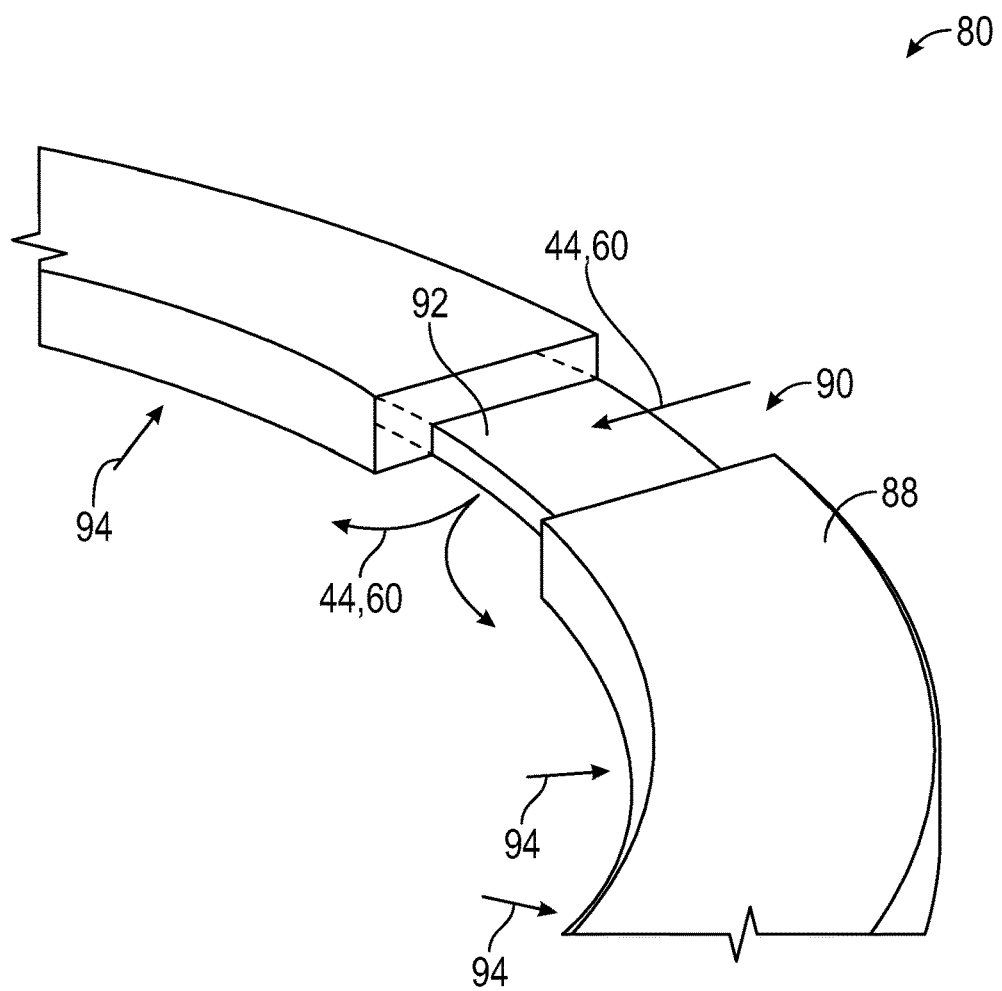
FIG. 8 is a partial perspective view of an example embodiment of a metallic seal in the form of a gapless ring, according to an embodiment of the present disclosure.

In general, elastomeric seals 82 may provide better sealing effectiveness than metallic seals 80. However, metallic seals 80 may be more resistant to the effects of pressure transients and/or different types of process fluids 44, which may otherwise damage elastomeric seals 82 and/or thermoplastic seals 84. In some embodiments, the metallic seal 80 may be a continuous ring 86 as shown in FIG. 7, or a gapless ring 88, as in FIG. 8. In some embodiments, the metallic seal 80, such as the continuous ring 86 may be etched or include cuts to allow for deformation and elasticity, for example, to enable assembly and/or for biasing the metallic seal 80 against the sealing armature 64 or frame 54/stationary component for increased sealing. Furthermore, in some embodiments, the gapless ring 88 may utilize a split 90 in the gapless ring 88 with a rail 92 thereunder such that the pressure of the barrier fluid 60 and/or process fluid 44 provides loading pressure 94 to assist in sealing the gapless ring 88 to the sealing armature 64 and/or frame 54/stationary component. As should be appreciated, the rail 92 may extend around a partial (e.g., less than 360 degrees, less than 180 degrees, less than 90 degrees, less than 45 degrees, less than 30 degrees, and so on) or full (e.g., 360 degrees) amount of the circumference of the gapless ring 88.

Figure 9:
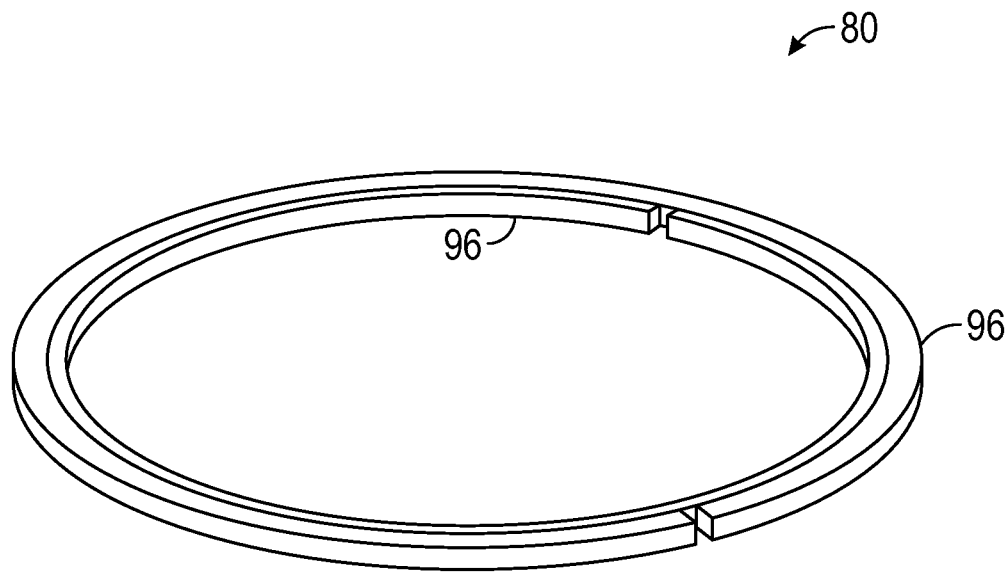
FIG. 9 is a perspective view of an example embodiment of a metallic seal in the form of split rings, according to an embodiment of the present disclosure.
Figure 10:
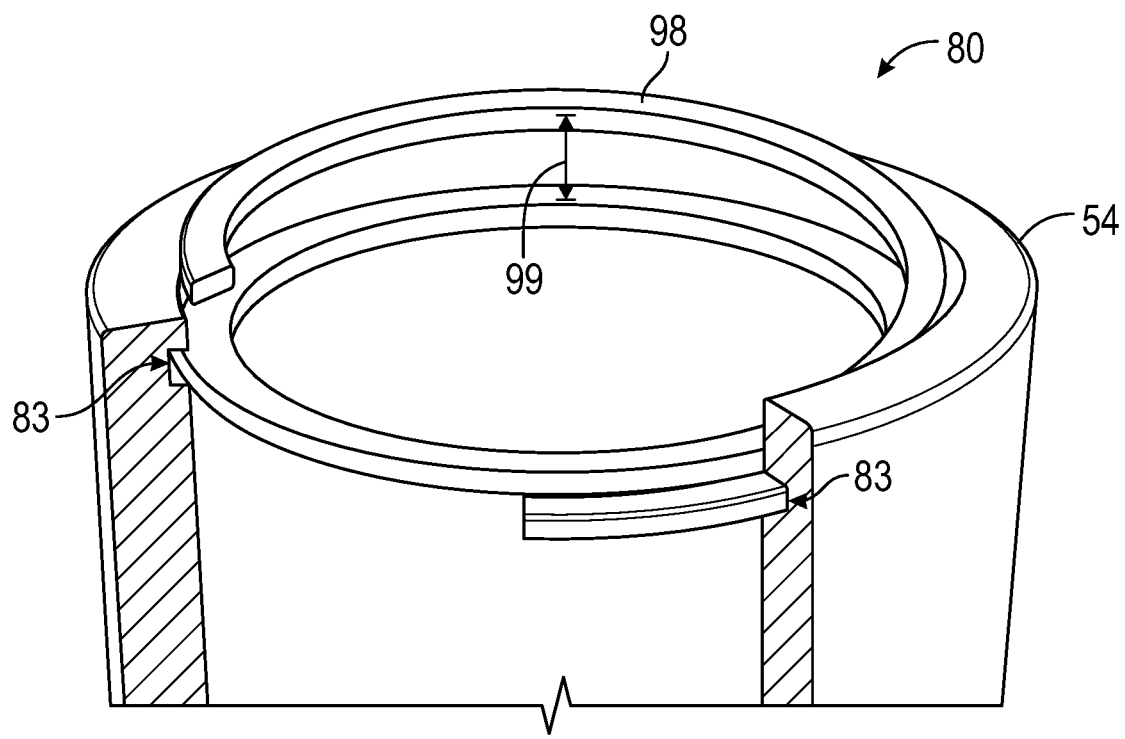
FIG. 10 is a perspective view of an example embodiment of a metallic seal in the form of a spiral split ring, according to an embodiment of the present disclosure.

Moreover, in some embodiments, the metallic seal 80 may be or include one or more split rings such as in FIG. 9. Split rings 96 may be utilized in conjunction with one another such that their splits are at different azimuthal points relative to each other for increased sealing. Furthermore, split rings 96 may allow for biasing to either the sealing armature 64 or frame 54/stationary component due to their inherent split and adjustability. As should be appreciated, the split rings 96 may be disposed in a single plane (e.g., planar) or traverse in the axial direction 68 with changes in azimuth. For example, in some embodiments, the metallic seal 80 may include a spiral split ring 98, as shown in FIG. 10, with at least one full rotation (e.g., at least 1.5 rotations, 2 rotations, 2.5 rotations, 3 rotations, 4 rotations, and so on) and an axial offset 99 between cross-sectional midpoints of the different turns. The spiral split ring 98 may provide multiple layers of sealing while remaining a single metallic seal 80. Furthermore, in some embodiments, the sealing armature 64 and/or frame 54 may include a single groove 83, in which the spiral split ring 98 is disposed, or separate grooves 83 for each turn of the spiral, as shown.

Figure 11:
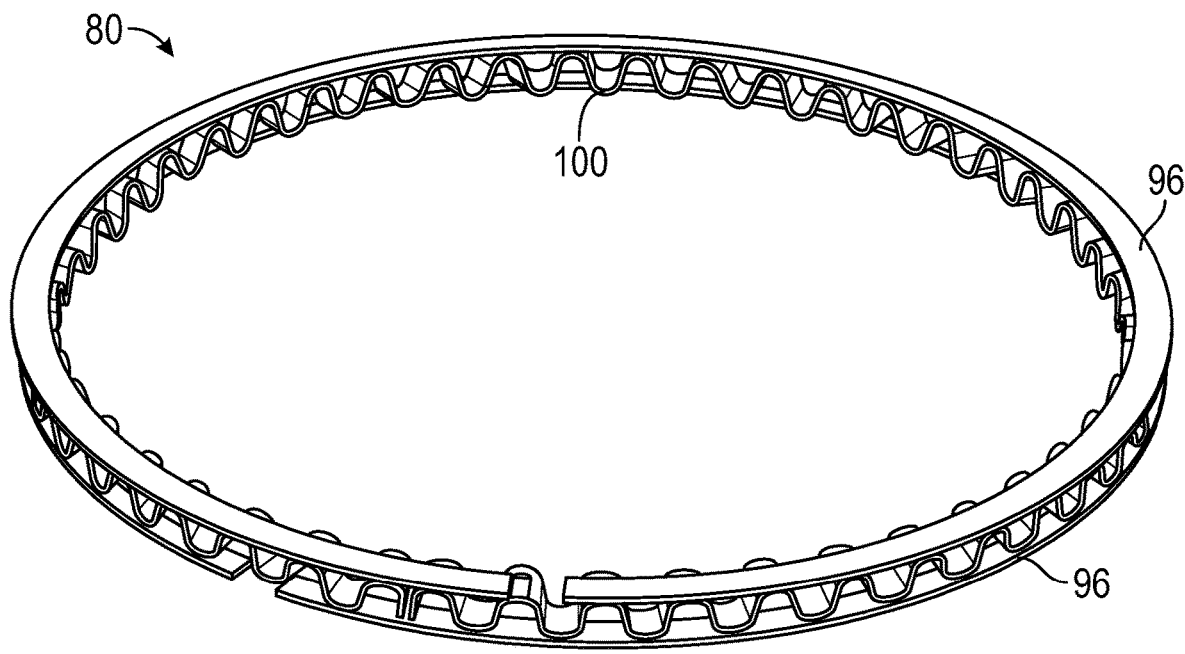
FIG. 11 is a perspective view of an example embodiment of a metallic seal including an axial biasing element, according to an embodiment of the present disclosure.
Figure 12:
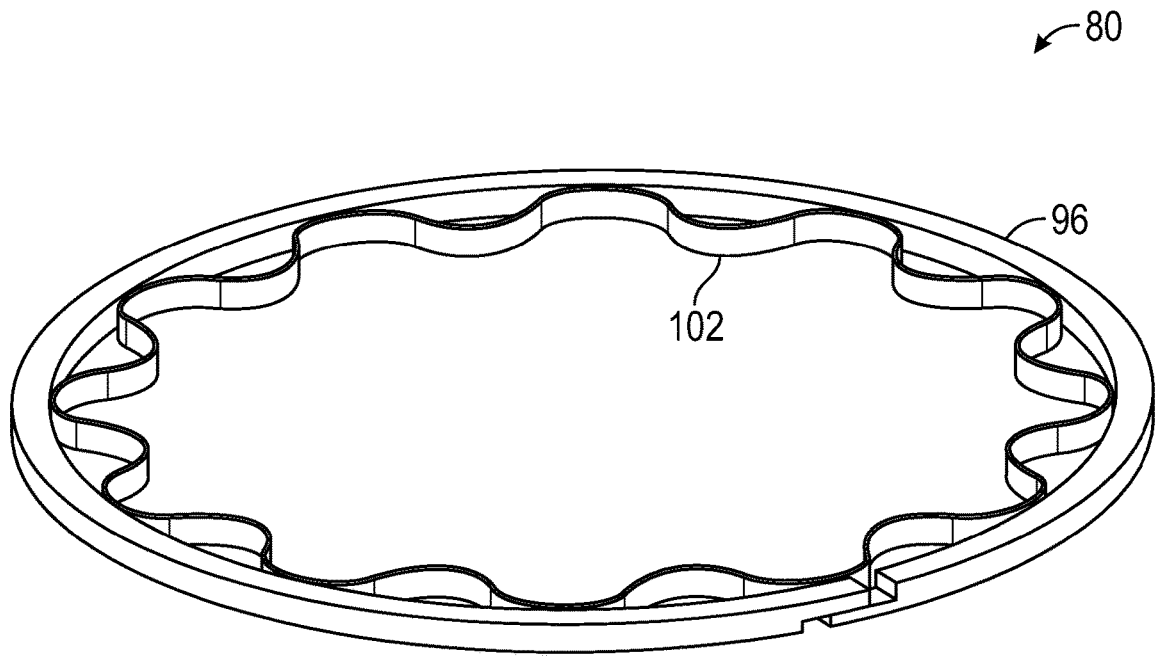
FIG. 12 is a perspective view of an example embodiment of a metallic seal including a radial biasing element, according to an embodiment of the present disclosure.

Additionally, in some embodiments, the metallic seal 80 may include axial biasing elements 100, as in FIG. 11, and/or radial biasing elements 102, as in FIG. 12, such as springs to bias the metallic seal 80 in the axial direction 68 (e.g., within grooves 83) in the radial direction 70 towards the sealing armature 64 or frame 54/stationary component (e.g., towards the inner annular surface 77 or outer annular surface 79), respectively. For example, the axial biasing elements 100 may include wave portions of a wave pattern in a ring, such as a wavy ring that curves axially back and forth in opposite axial directions about a circumference of the ring. The axial biasing elements 100 also may be described as U-shaped members. Similarly, the radial biasing elements 102 may include wave portions of a wave pattern in a ring, such as a wavy ring that curves radially inward and outward in opposite radial directions about a circumference of the ring. The radial biasing elements 102 also may be described as U-shaped members. Furthermore, while shown within (e.g., extending from the inner diameter) the split ring 96, such radial biasing elements 102 may also be on the exterior of the metallic seals 80 discussed herein, for example, to bias the metallic seal 80 toward outer annular surface 79 of the sealing armature 64. By biasing the metallic seal 80 to either the sealing armature 64 or frame 54/stationary component, sealing may be improved. As should be appreciated, while shown in with split rings 96, the axial biasing elements 100 and/or radial biasing elements 102 may be implemented with the continuous ring 86 and/or gapless ring 88.

Figure 13A:
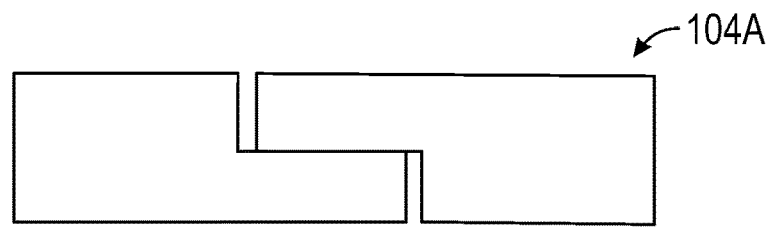
FIGS. 13A-13C are partial cross-sectional views of example embodiments of splits in a metallic seal in a circumferential direction relative to a central axis of the metallic seal, according to an embodiment of the present disclosure.
Figure 13B:
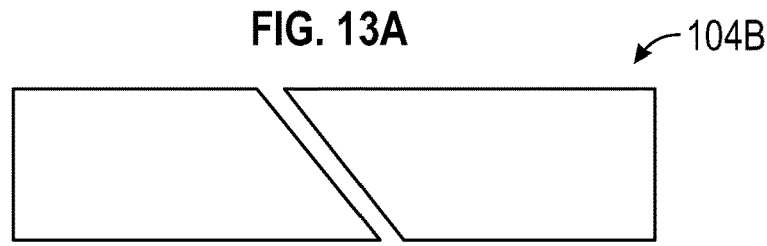
Figure 13C:
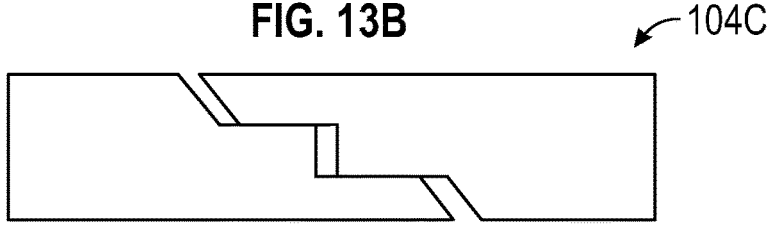
Figures 14A, 14B:
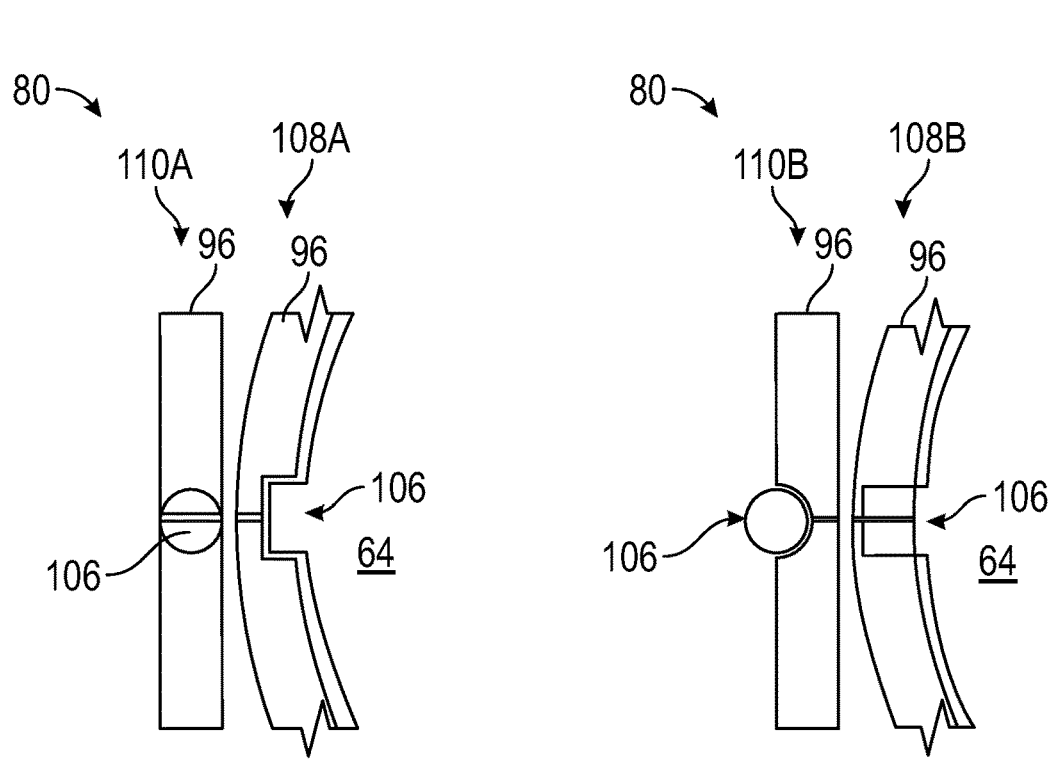
FIG. 14A is a partial side view and a partial top view of an example embodiment of a split in a metallic seal with a protrusion from the sealing armature, according to an embodiment of the present disclosure.
FIG. 14B is a partial side view and a partial top view of an example embodiment of a split in a metallic seal with a protrusion from the sealing armature, according to an embodiment of the present disclosure.
Figure 15A:
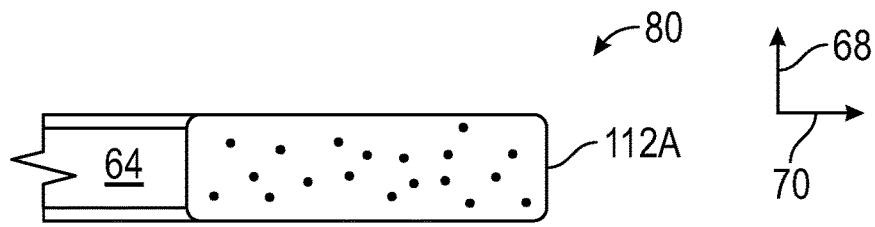
FIGS. 15A-15F are partial cross-sectional side views of example embodiments of cross sections of a metallic seal in a radial direction, according to an embodiment of the present disclosure.
Figure 15B:
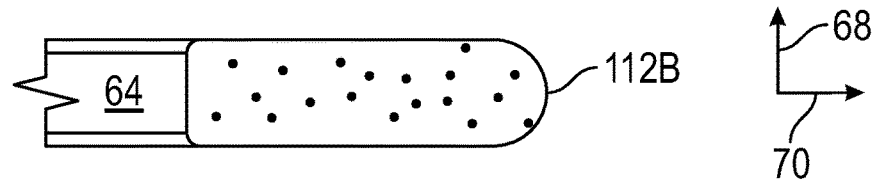
Figure 15C:
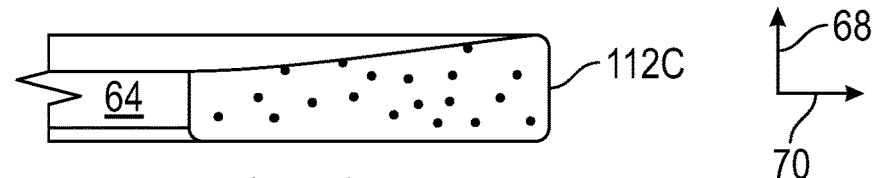
Figure 15D:
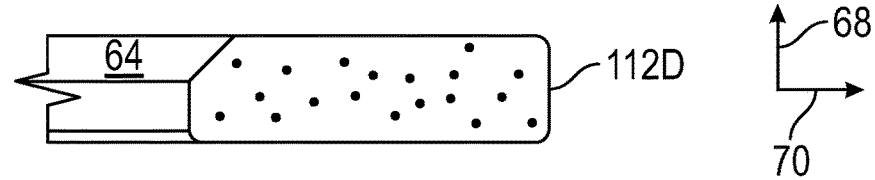
Figure 15E:
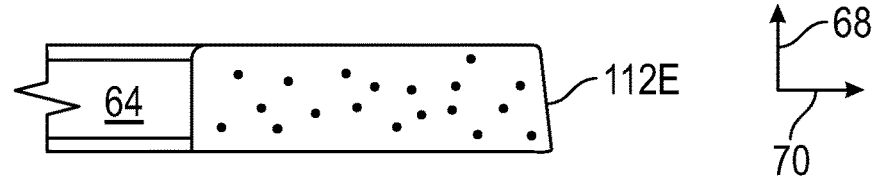
Figure 15F:
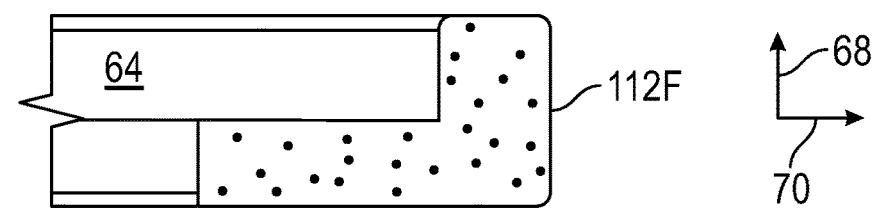
Figure 16:
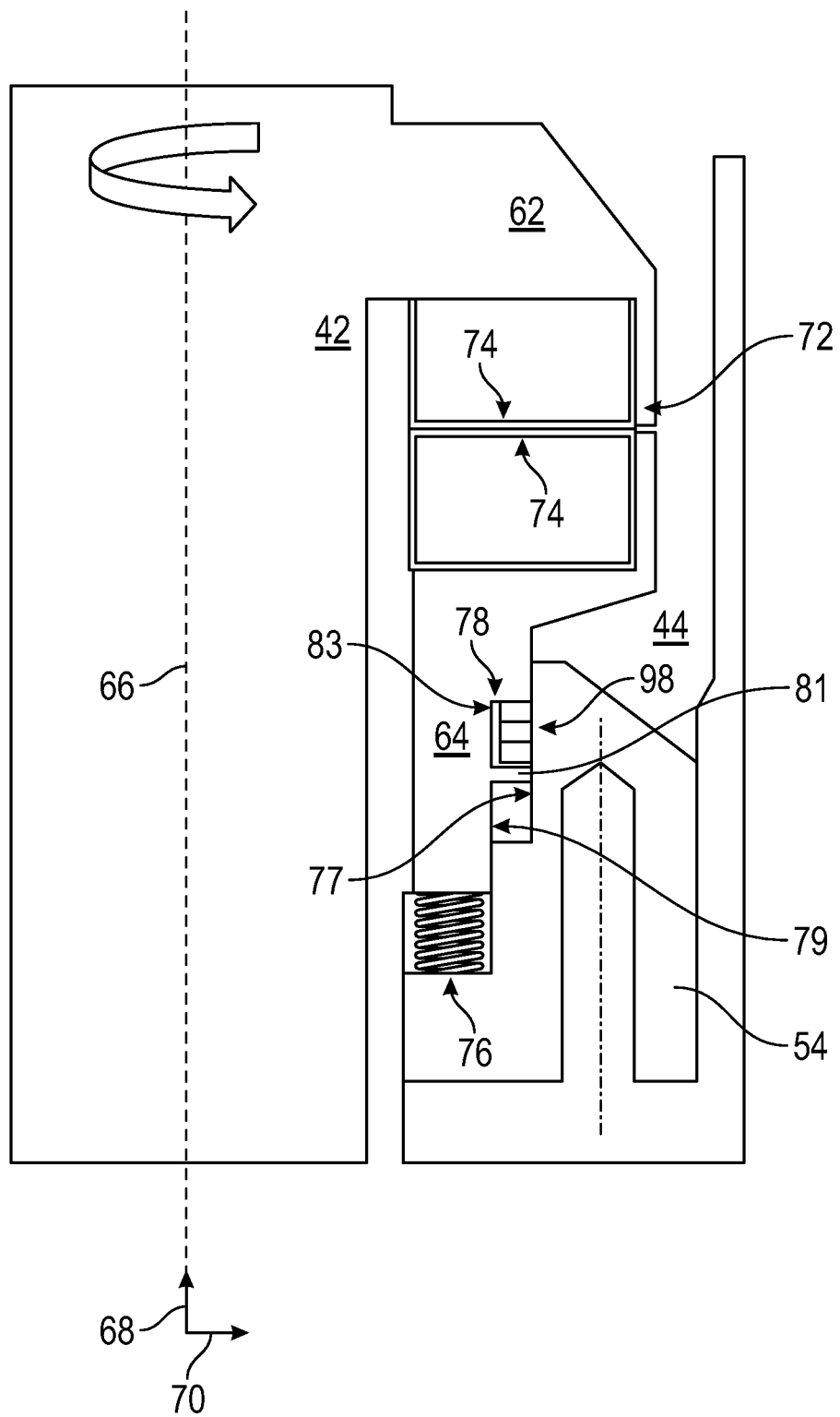
FIGS. 16-27 are schematic cross-sectional side views of example arrangements of a metallic seal with or without elastomeric and thermoplastic seals, according to an embodiment of the present disclosure.

In some embodiments, a split ring 96 of the metallic seal 80 may utilize an overlapping split 104A, a slanted split 104B, or a multi-step or staggered split 104C (cumulatively 104), which partially overlap in a circumferential direction about an axis of the metallic seal 80, as shown in FIGS. 13A, 13B, and 13C, respectively. In certain embodiments, the splits 104A, 104B, and 104C overlap in the circumferential direction over an angular range of greater than 0 and less than about 1, 2, 3, 4, 5, 6, 7, 8, 9, or 10 degrees about the axis of the metallic seal 80. Moreover, in some embodiments, the sealing armature 64 and/or frame 54/stationary component may include one or more protrusions 106 (e.g., radial protraction, key, or anti-rotation feature, or axial guide), as shown in the top views 108A, 108B and side views 110A, 110B of FIGS. 14A and 14B respectively. The protrusions 106 may assist in retaining the metallic seal 80 in an angular position relative to the sealing armature 64 or frame 54/stationary component, while enabling axial movement. As should be appreciated, additional types of splits 104 may also be used with the metallic seal 80. For example, the split 104 of the split ring 96 of the metallic seal 80 may be any of those associated with piston rings of reciprocating engines. Furthermore, the metallic seal 80 may have any suitable cross section 112, such as a square cross section 112A, a barrel face cross section 112B, a keystone cross section 112C, a torsional twist cross section 112D, a taper face cross section 112E, or a dykes cross section 112F, as shown as non-limiting examples in FIGS. 15A, 15B, 15C, 15D, 15E, and 15F, respectively. Moreover, the metallic seal 80 may have any suitable cross section 112 such as those associated with piston rings of reciprocating engines.

Figure 17:
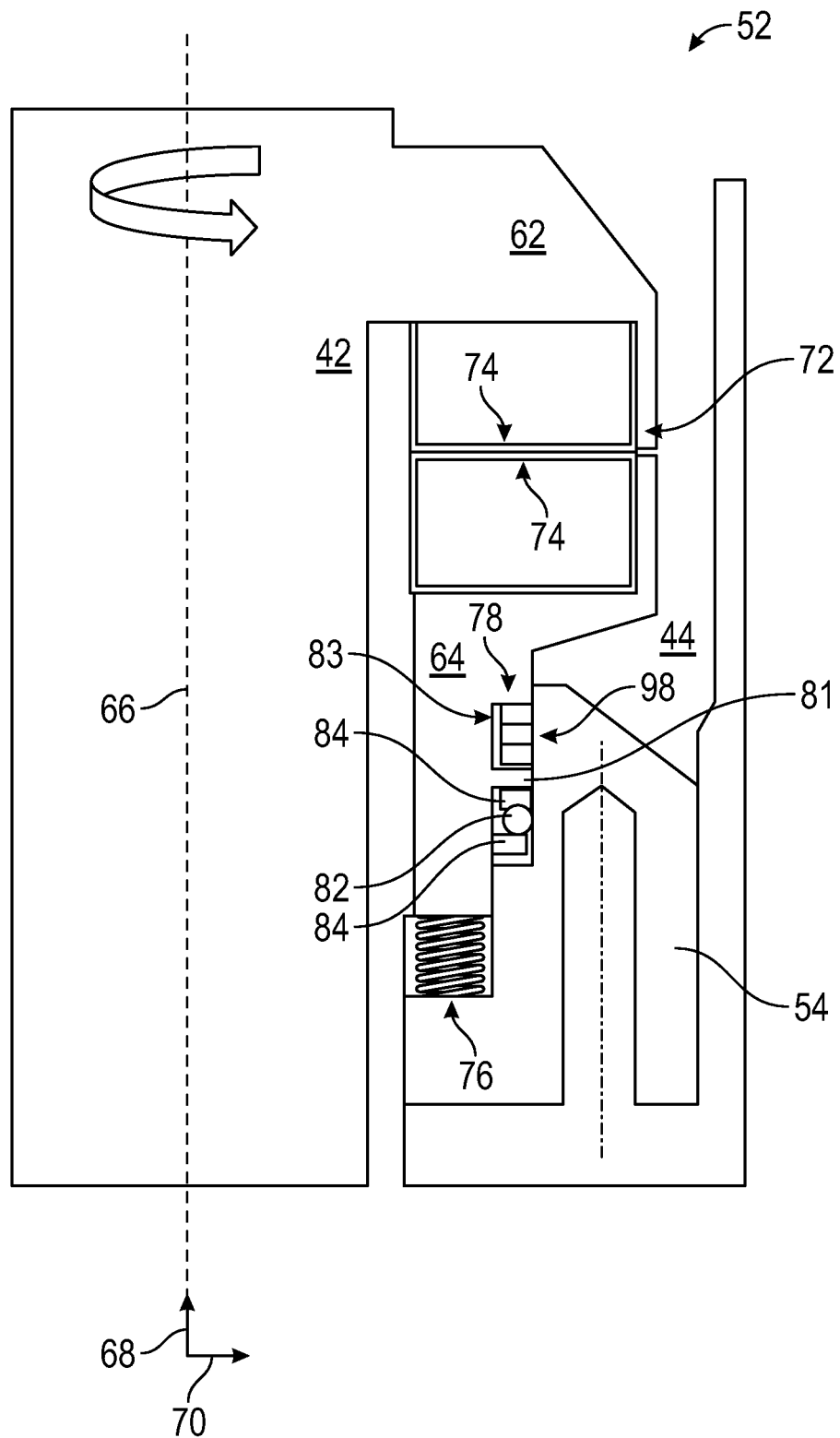
Figure 18:
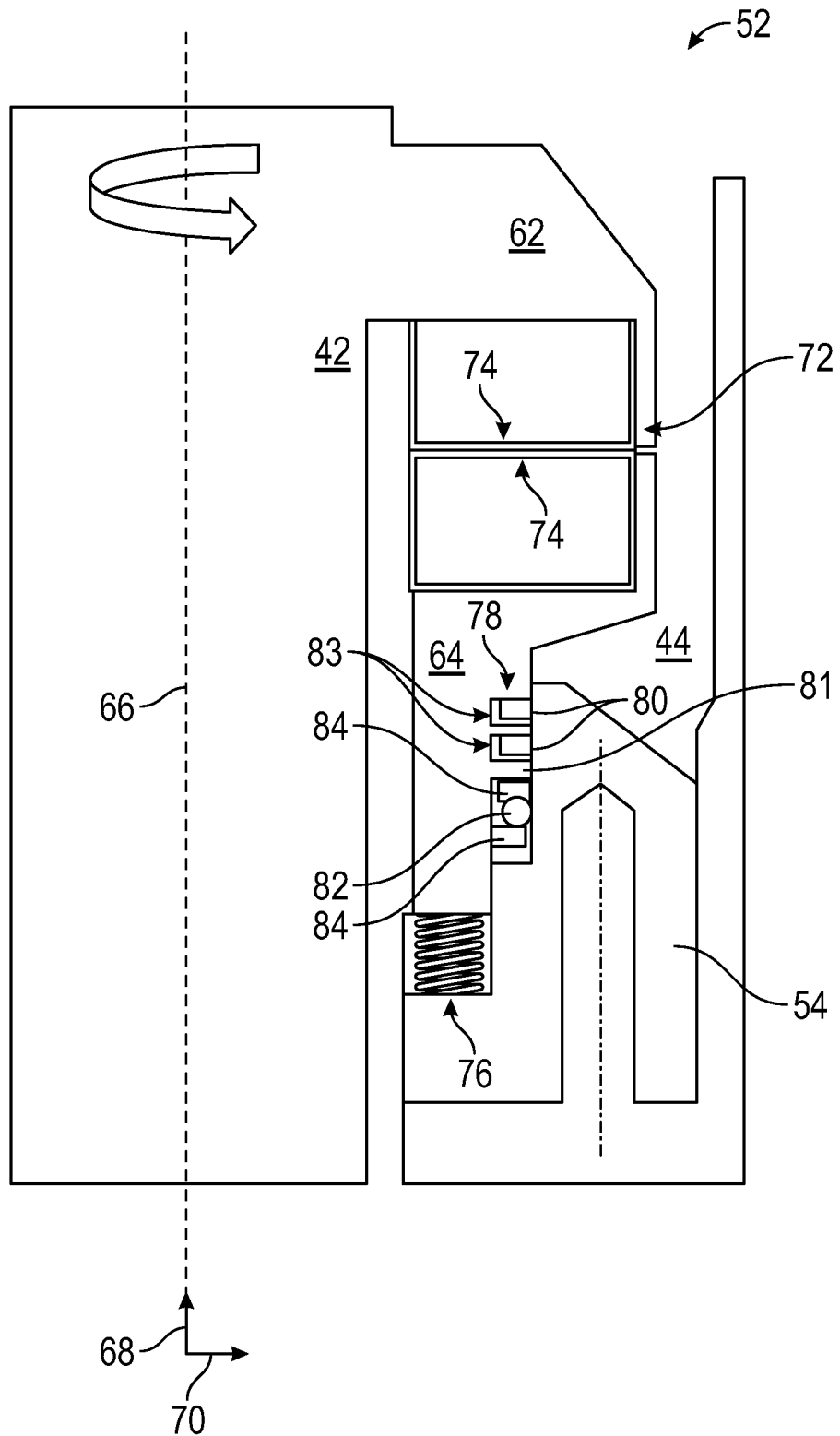

As discussed herein, the dynamic axial seal 78 may utilize one or multiple different types, shapes, or biases of metallic seal 80. FIGS. 16-27 are schematic views of example arrangements of a metallic seal 80 with or without elastomeric seals 82 and/or thermoplastic seals 84. For example, FIG. 16 includes a single spiral split ring 98 that overlaps itself three times (e.g., three 360 degree loops). As should be appreciated, the components of FIGS. 16-27 may be substantially similar to those of FIGS. 5 and 6 except where distinctions are noted or shown. FIG. 17 includes a single spiral split ring 98 in conjunction with an elastomeric seal 82 and thermoplastic seals 84 on axially opposite sides of the elastomeric seal 82, and FIG. 18 includes two continuous, split, or gapless metallic seals 80 in conjunction with an elastomeric seal 82 and thermoplastic seals 84 on axially opposite sides of the elastomeric seal 82. As discussed above, elastomeric seals 82 may provide better sealing effectiveness than metallic seals 80. However, metallic seals 80 may be more resistant to the effects of pressure transients and/or different types of process fluids 44, which may otherwise damage elastomeric seals 82 and/or thermoplastic seals 84. As such, by combining the metallic seal 80 with the elastomeric seal 82, the metallic seal 80 (e.g., spring split ring 98, split ring 96, gapless ring 88, or continuous ring 86) certain scenarios that would otherwise damage the elastomeric seal 82 may be reduced. For example, the metallic seal 80 may reduce the pressure transient felt by the elastomeric seal 82 to a level that is non-damaging to the elastomeric seal 82. As such, the effectiveness of the elastomeric seal 82 may be retained when used in conjunction with a metallic seal 80.

Figure 19:
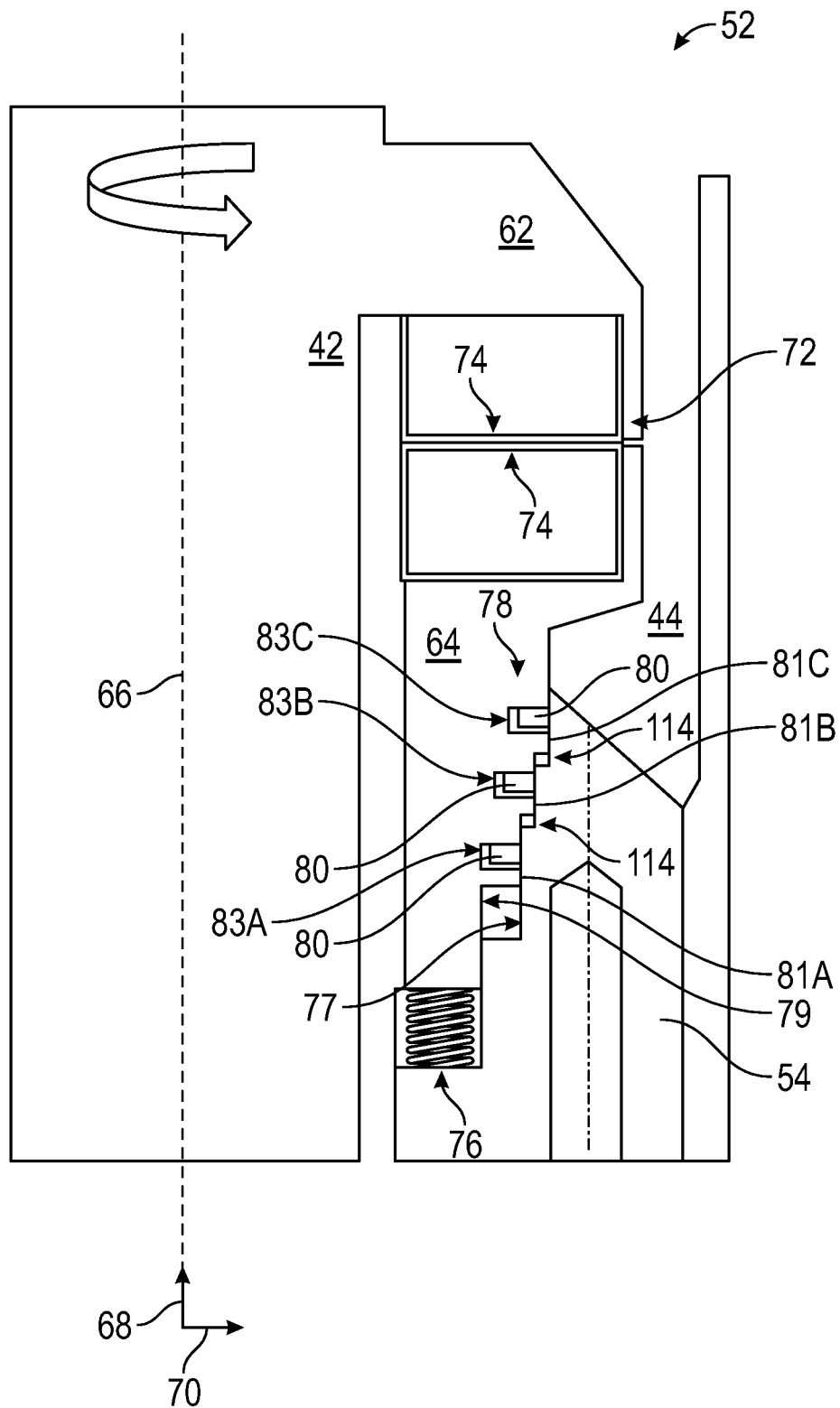
Figure 20:
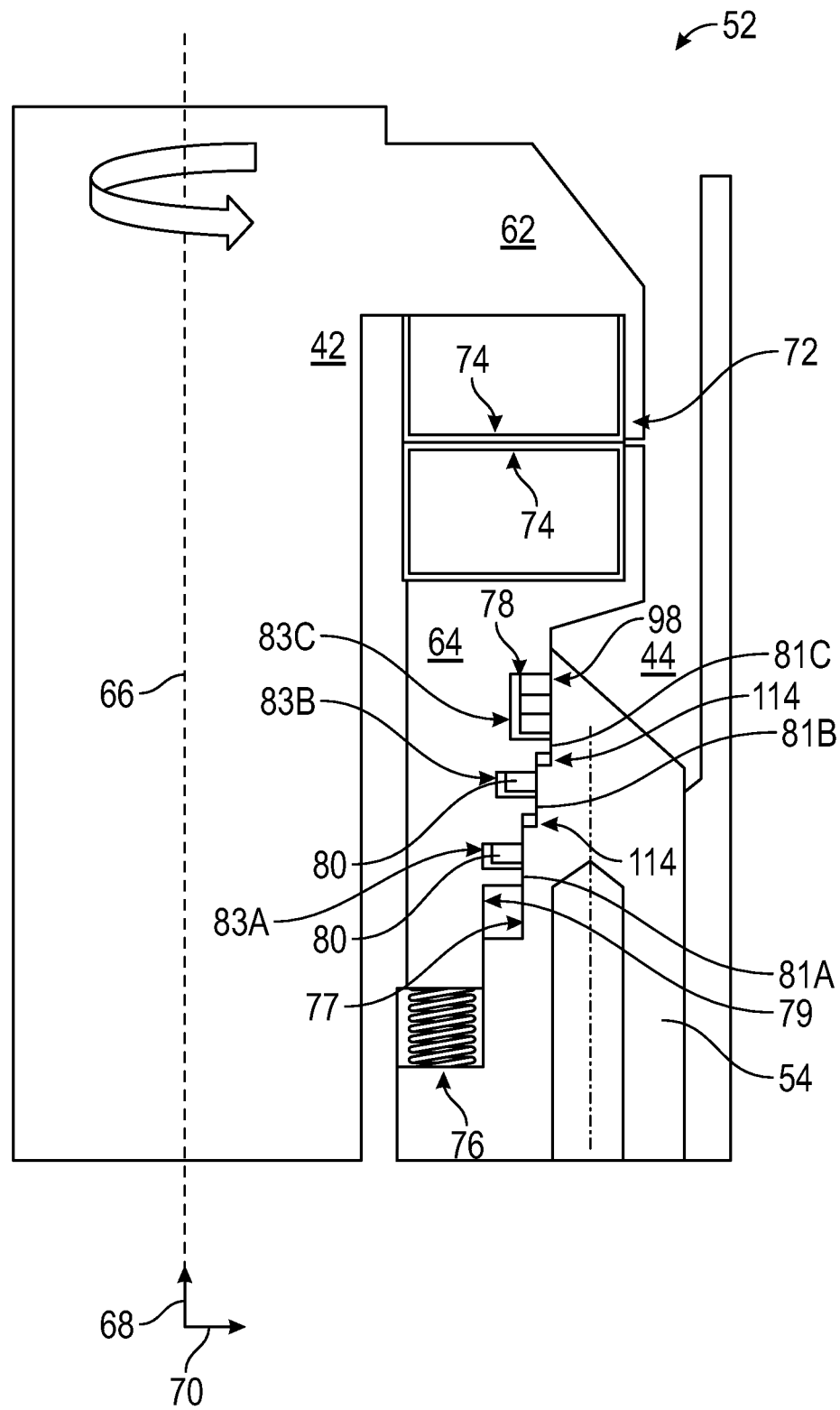
Figure 21:
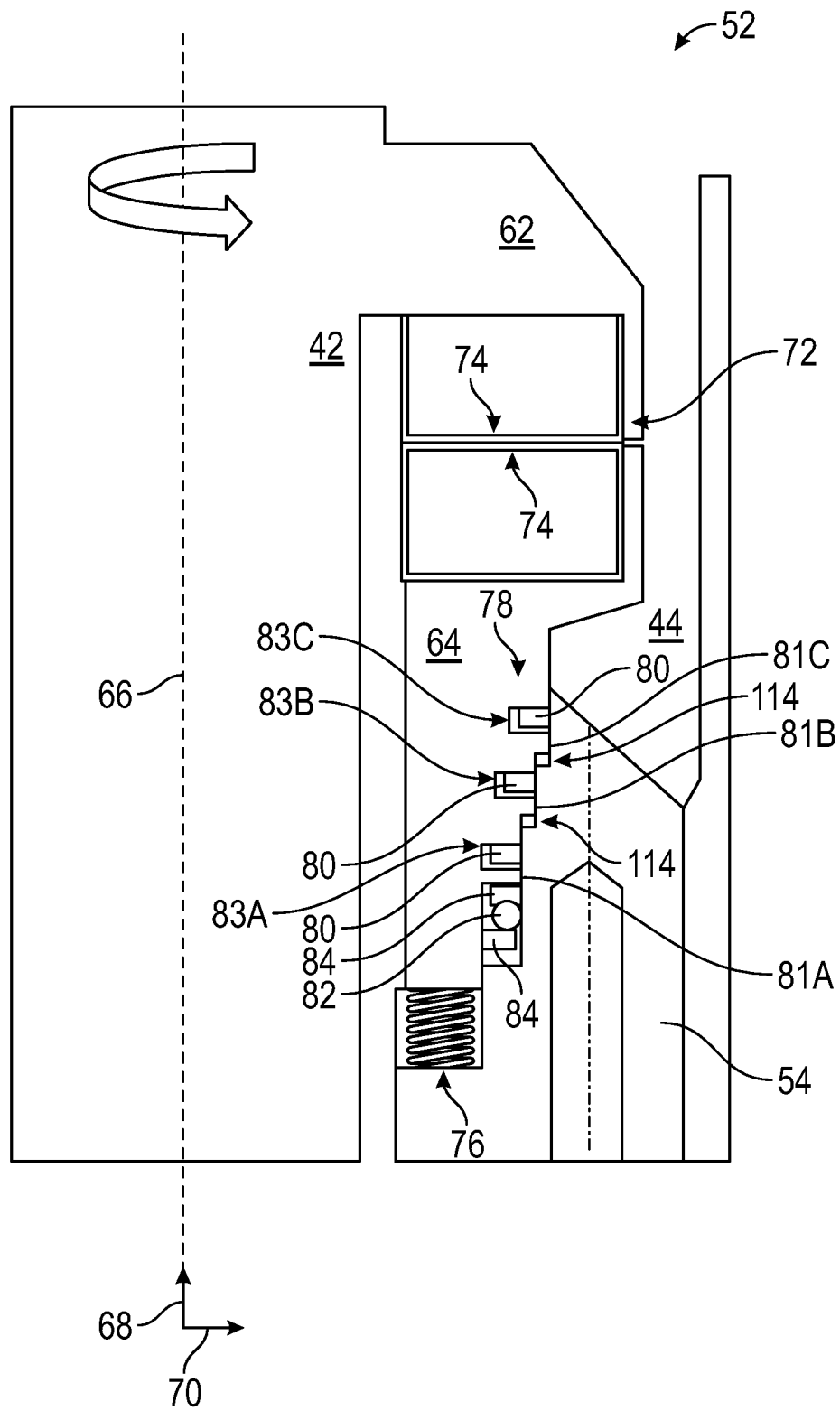
Figure 22:
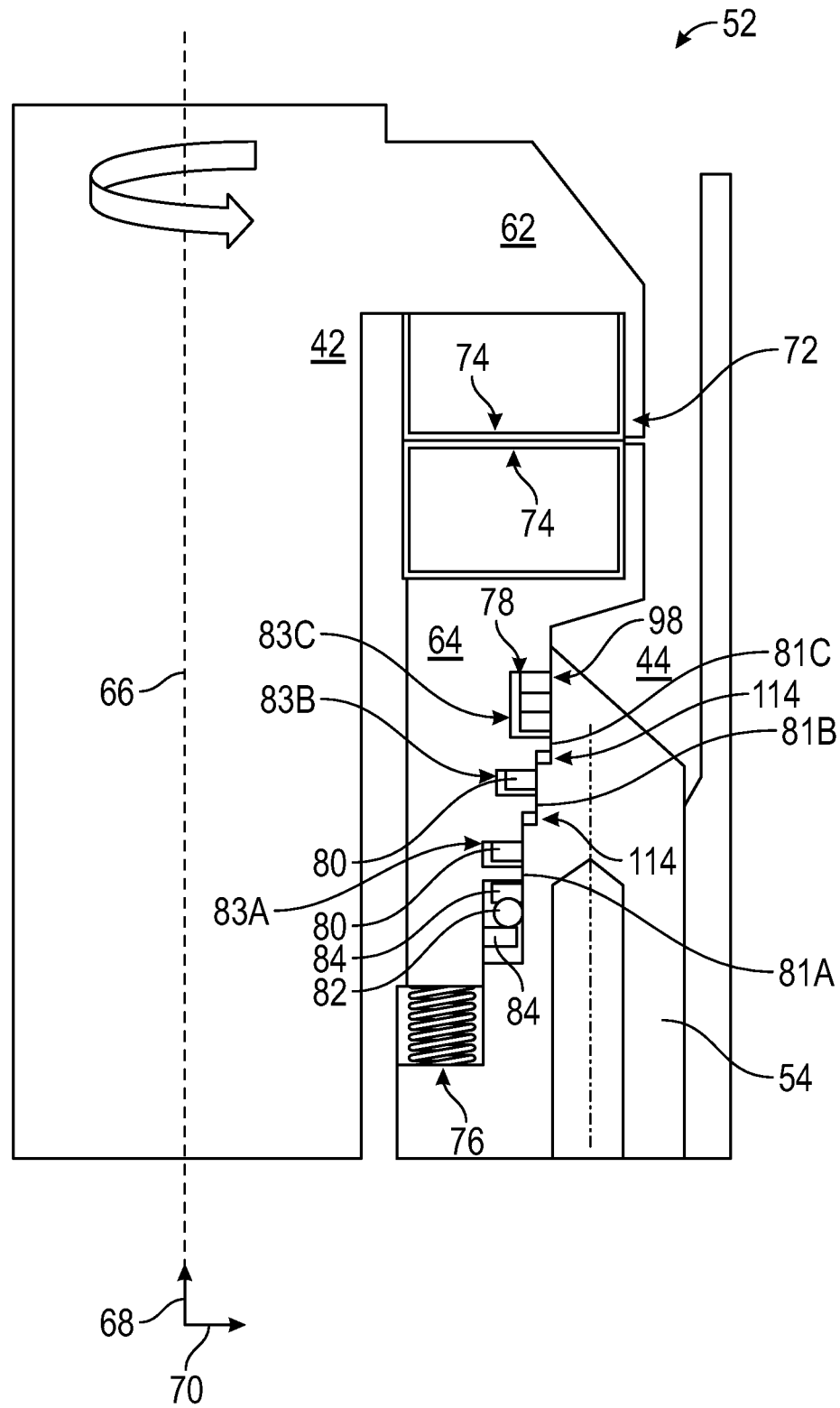

Additionally, in some embodiments, the metallic seals 80, elastomeric seals 82, and/or thermoplastic seals 84 may be staggered in the radial direction 70, such as with the radial staggering 114 of three metallic seals 80 in FIG. 19. By staggering the seals in the radial direction 70 (e.g., multiple diameters of seals), flow of leakage may be shunted and reduced. For example, projections 81A, 81B, and 81C that form grooves 83A, 83B, and 83C, respectively, may be provided at different radial positions of the outer annular surface 79 of the sealing armature 64. Moreover, the metallic seals 80 may be disposed in the different radially positioned grooves 83 (e.g., 83A, 83B, and 83C) to seal against respectively staggered portions of the inner annular surface 77 of the frame 54. As should be appreciated and discussed above, while shown as grooves 83 of the sealing armature 64, grooves 83 may also or instead be disposed on the frame 54 or other stationary component for mating with the metallic seals 80. Moreover, the radial staggering 114 and/or grooves 83 in either the sealing armature 64 or frame 54 may instead or also be used in conjunction with one or more elastomeric seals 82 and/or thermoplastic seals 84. FIG. 20 includes substantially similar radial staggering 114 and grooves 83A, 83B, and 83C of FIG. 19 in conjunction with a spiral split ring 98 and two continuous, split, or gapless metallic seals 80. Indeed, in some embodiments, one or more of the grooves 83 (e.g., annular grooves) may be larger than the others to accommodate the spiral split ring 98 having multiple turns. Additionally, FIG. 21 includes substantially similar radial staggering 114 and grooves 83A, 83B, and 83C of FIG. 19 and three radially staggered continuous, split, or gapless metallic seals 80 in conjunction with an elastomeric seal 82 and thermoplastic seals 84 on axially opposite sides of the elastomeric seal 82. Moreover, FIG. 22 includes substantially similar radial staggering 114 and grooves 83A, 83B, and 83C as FIG. 20 with a spiral split ring 98 and two continuous, split, or gapless metallic seals 80 in conjunction with an elastomeric seal 82 and thermoplastic seals 84 on axially opposite sides of the elastomeric seal 82.

Figure 23:
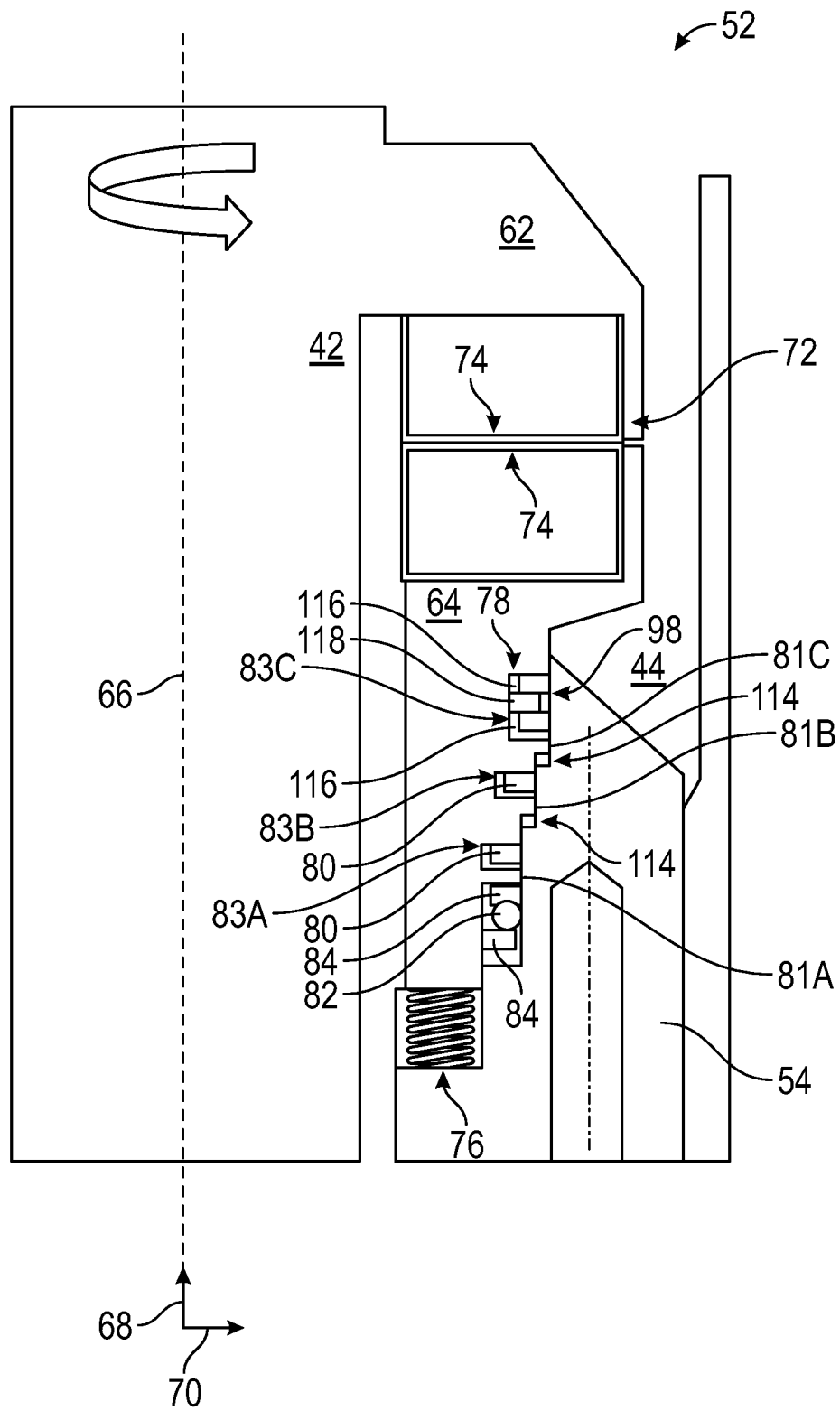
Figure 24:
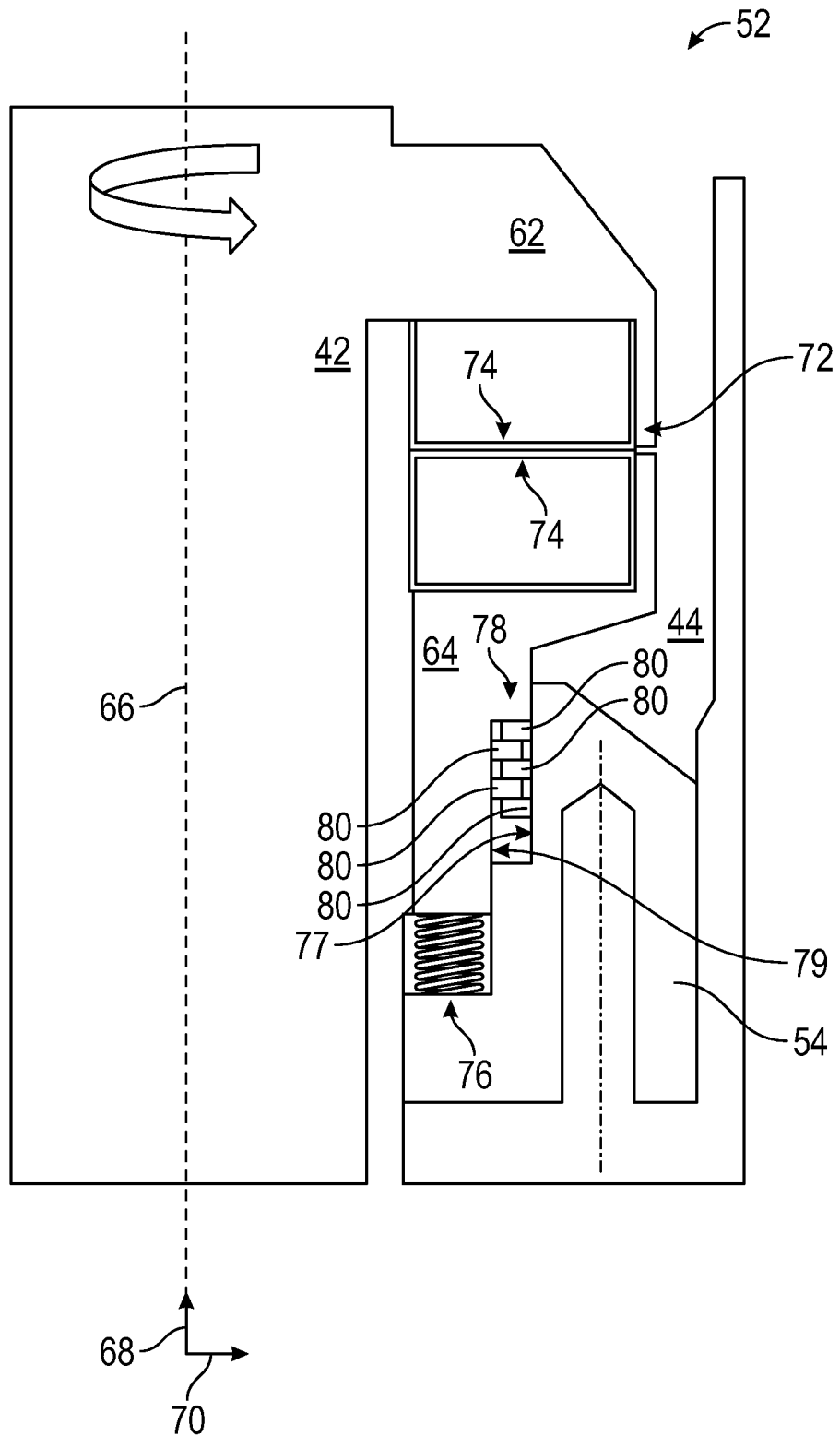
Figure 25:
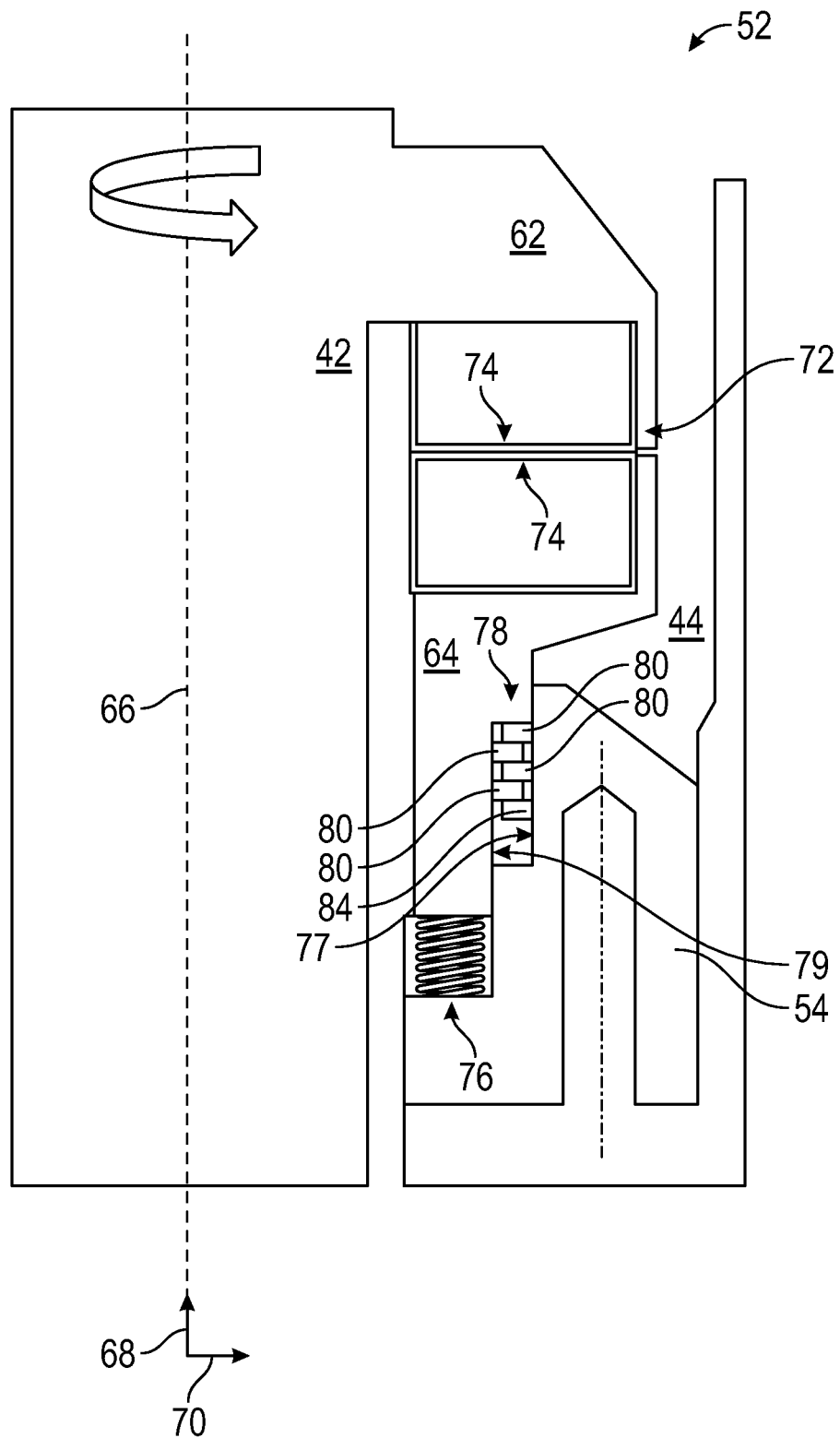
Figure 26:
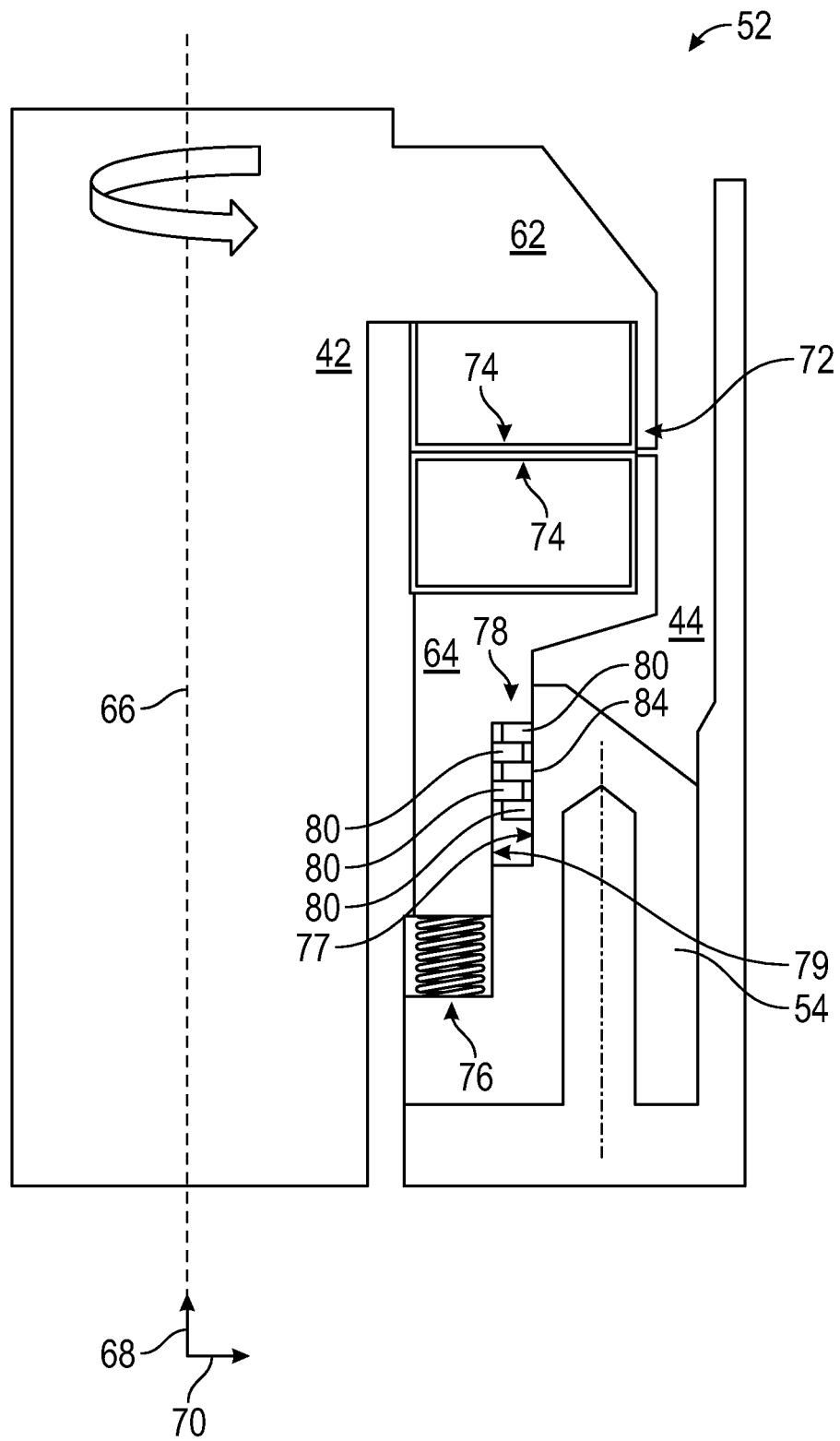
Figure 27:
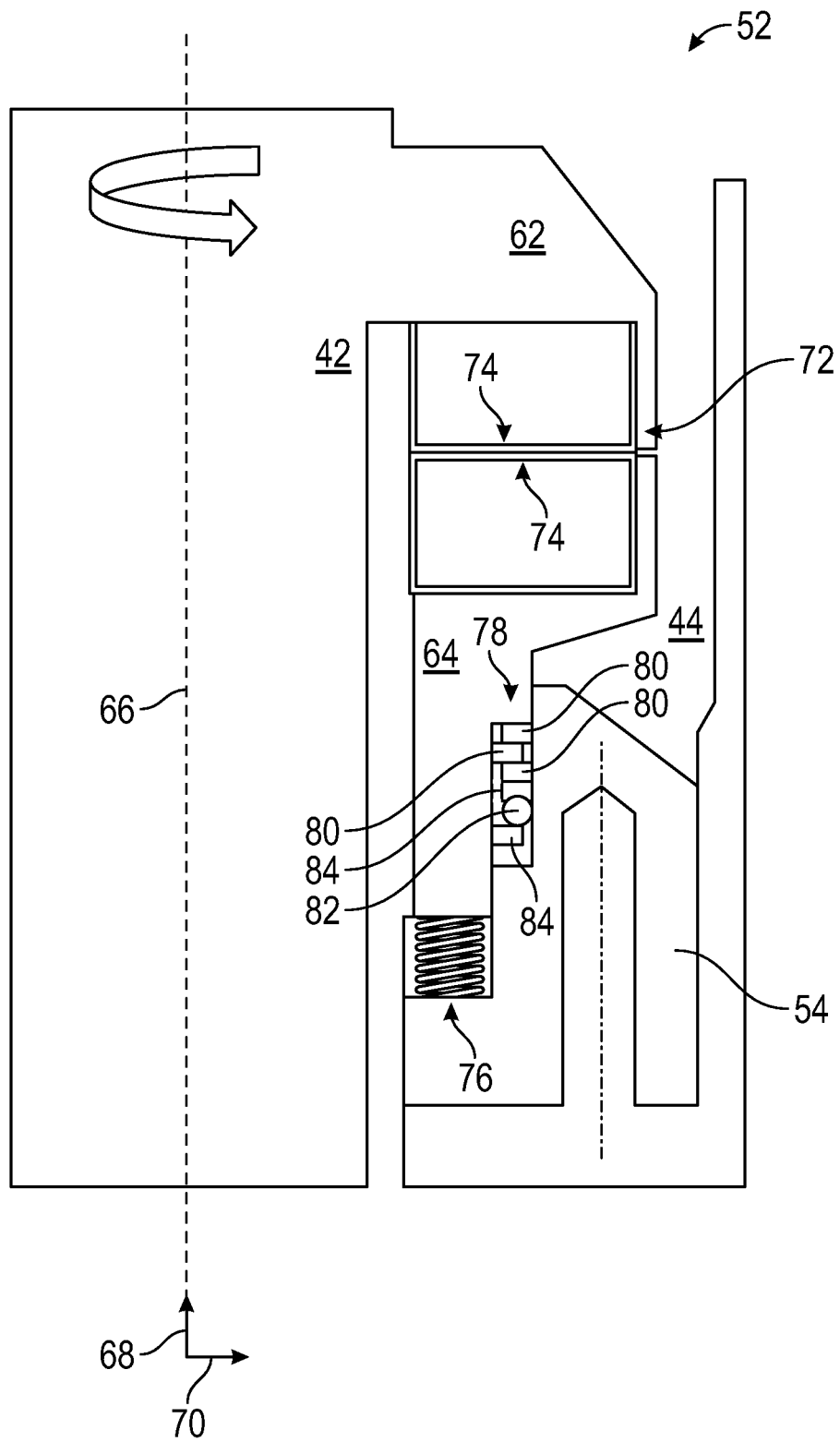

In some embodiments, one or more of the metallic seals 80 may or may not include radial biases towards the sealing armature 64 and/or frame 54/stationary component (e.g., towards the outer annular surface 79 and/or inner annular surface 77). For example, FIG. 23 depicts a spiral split ring 98 having two biased-out turns 116 (e.g., radially outward bias toward the inner annular surface 77) and one biased-in turn 118 (e.g., radially inward bias toward the outer annular surface 79) relative to the radial direction 70 as well as a radial staggering 114, two continuous, split, or gapless metallic seals 80 in conjunction with an elastomeric seal 82 and thermoplastic seals 84 on axially opposite sides of the elastomeric seal 82. By biasing some portions of the spiral split ring 98 radially inward toward the scaling armature 64 and others radially outward toward the frame 54/stationary component, scaling may be improved. Furthermore, an array of continuous, split (e.g., planar), or gapless metallic seals 80 may also be utilized in biased-in and biased-out arrangements, as shown in FIG. 24. Moreover, in some embodiments, the biased-in and biased-out arrangements may be used in conjunction with one or more thermoplastic seals 84 in different orders as in FIGS. 25 and 26, or in conjunction with an elastomeric seal 82 and thermoplastic seals 84 on axially opposite sides of the elastomeric seal 82, as in FIG. 27. Furthermore, as with the metallic seals 80, the thermoplastic seals 84 and/or elastomeric seals 82 may be biased-in, biased-out, or not biased.

As should be appreciated, while certain embodiments are depicted, the embodiments of FIGS. 16-27 are non-limiting, and additional arrangements may also be envisioned using at least one metallic seal 80 with or without additional elastomeric seals 82 and/or thermoplastic seals 84. Furthermore, certain portions of FIGS. 5, 6, and 16-27 are substantially similar, and components from the embodiments thereof may be combined or reorganized therewith and/or modified based thereon. For example, in some embodiments, thermoplastic seals 84 and/or elastomeric seals 82 may be omitted, and/or the arrangement of seals may be in different orders, biases, or numbers than those of the depicted examples. Furthermore, it should be appreciated that continuous ring embodiments (e.g., solid and/or gapless), split ring embodiments (e.g., planer and/or spiral), embodiments incorporating one or more elastomeric seals, embodiments, incorporating one or more thermoplastic seals, embodiments including biased arrangements (e.g., biased-in and/or biased-out), embodiments including radial staggering 114, and embodiments that include or omit grooves 83 (e.g., with or without extrusions 81) may be utilized in any suitable combination and are not mutually exclusive.

Figure 28:
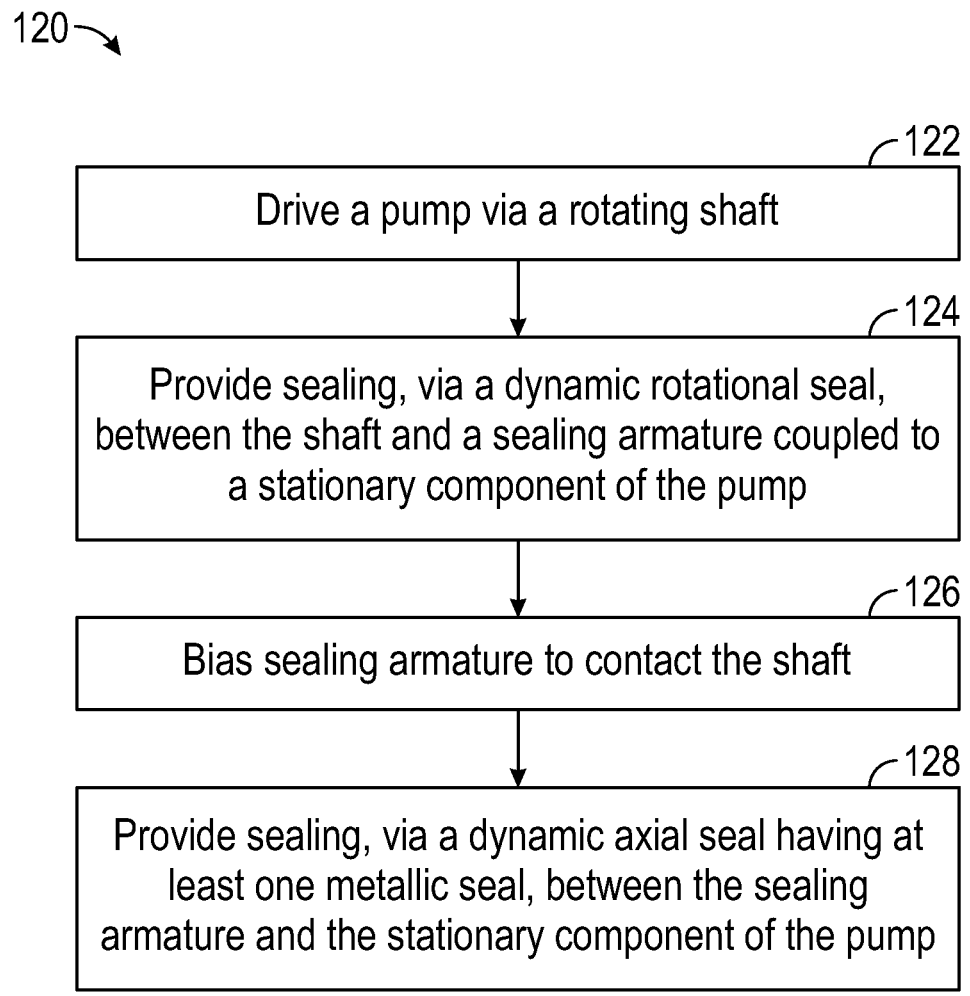
FIG. 28 is a flowchart of an example process for sealing a pump with a seal assembly of FIGS. 1-27, according to an embodiment of the present disclosure.

FIG. 28 is a flowchart of an example process 120 for utilizing a metallic seal 80 as part of a dynamic axial seal 78. In general, a pump 36 (e.g., pump section 40) may be driven by rotating a shaft 42 (process block 122). Sealing may be provided, via a dynamic rotational seal 72, between the shaft 42 and a sealing armature 64 that is coupled to a stationary component of the pump 36 (e.g., frame 54) (process block 124). The sealing armature 64 may be biased to contact the shaft 42 (process block 126), for example, to maintain a seal between the mating surfaces 74 of the dynamic rotational seal 72. Additionally, sealing may be provided, via a dynamic axial seal 78 having at least one metallic seal 80, between the sealing armature 64 and the stationary component of the pump 36 (process block 128).

The technical effects of the systems and methods described in the embodiments of FIGS. 1-28 include improved dynamic sealing within a pump/compressor. Additionally, by utilizing a metallic seal 80, sealing may be improved while increasing the longevity and/or viability of elastomeric seals 82 and/or thermoplastic seals 84 in scenarios that would otherwise damage such seals. Furthermore, although the above referenced flowchart is shown in a given order, in certain embodiments, process blocks may be reordered, altered, deleted, and/or occur simultaneously. Additionally, the referenced flowchart is given as an illustrative tool and further decision and process blocks may also be added depending on implementation.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. A fluid processing machine configured to operate on a process fluid, the fluid processing machine comprising:
   a frame configured to structurally support at least a portion of the fluid processing machine;
   a shaft configured to operatively rotate about an axis and relative to the frame, the shaft comprising a projection in a radial direction relative to the axis;
   a sealing armature configured to contact the projection, wherein the sealing armature comprises an axial degree of freedom relative to the axis;
   a dynamic rotational seal between the projection and the sealing armature; and
   a dynamic axial seal between the sealing armature and the frame, wherein the dynamic axial seal comprises one or more metallic seals and one or more elastomeric seals, wherein the one or more metallic seals are configured to seal between the sealing armature and the frame circumferentially about the axis and to protect the one or more elastomeric seals from pressure transients of the process fluid.

2. The fluid processing machine of claim 1, wherein the fluid processing machine comprises a pump configured to increase an operating pressure of the process fluid, and wherein the shaft is coupled to one or more pumping stages of the pump, and wherein the pumping stages are configured to operationally motivate a flow of the process fluid.

3. The fluid processing machine of claim 1, wherein the one or more metallic seals are biased radially inward toward the sealing armature, radially outward toward the frame, or both.

4. The fluid processing machine of claim 1, wherein the dynamic rotational seal and the dynamic axial seal are configured to form respective barriers between a barrier fluid in contact with the shaft and the process fluid in contact with the frame.

5. The fluid processing machine of claim 1, further comprising a biasing element configured to bias the sealing armature along the axial degree of freedom toward the projection.

6. The fluid processing machine of claim 1, wherein the one or more metallic seals comprise one or more split rings.

7. The fluid processing machine of claim 6, wherein the dynamic axial seal further comprises one or more thermoplastic seals.

8. The fluid processing machine of claim 6, wherein the one or more split rings comprise a spiral split ring.

9. The fluid processing machine of claim 1, wherein the one or more metallic seals comprise one or more continuous rings.

10. The fluid processing machine of claim 9, wherein the dynamic axial seal further comprises one or more thermoplastic seals.

11. The fluid processing machine of claim 1, wherein the one or more metallic seals comprise one or more gapless rings.

12. The fluid processing machine of claim 11, wherein the dynamic axial seal further comprises one or more thermoplastic seals.

13. A fluid processing machine configured to operate on a process fluid, the fluid processing machine comprising:
    a frame configured to structurally support at least a portion of the fluid processing machine;
    a shaft configured to operatively rotate about an axis and relative to the frame, the shaft comprising a projection in a radial direction relative to the axis;
    a sealing armature configured to contact the projection, wherein the sealing armature comprises an axial degree of freedom relative to the axis;
    a dynamic rotational seal between the projection and the sealing armature; and
    a dynamic axial seal between the sealing armature and the frame, wherein the dynamic axial seal comprises one or more metallic seals configured to seal between the sealing armature and the frame circumferentially about the axis,
    wherein the one or more metallic seals comprise at least two metallic seals, wherein the at least two metallic seals are staggered in the radial direction at different axial positions along the dynamic axial seal.

14. The fluid processing machine of claim 13, wherein the dynamic axial seal further comprises one or more elastomeric seals, one or more thermoplastic seals, or the one or more elastomeric seals and the one or more thermoplastic seals, and wherein the at least two metallic seals comprise a split ring and a continuous ring.

15. The fluid processing machine of claim 13, wherein the one or more metallic seals further comprise at least two additional metallic seals, wherein the at least four metallic seals are staggered in the radial direction at different axial positions along the dynamic axial seal, wherein a first metallic seal of the at least four metallic seals is biased outward toward the frame and a second metallic seal of the at least four metallic seals is biased inward toward the sealing armature, wherein the at least four metallic seals comprise a continuous solid ring, a gapless ring, a planar split ring, and a spiral split ring, and wherein the dynamic axial seal comprises one or more elastomeric seals and one or more thermoplastic seals, wherein the one or more metallic seals are configured to protect the one or more elastomeric seals, the one or more thermoplastic seals, or both the one or more elastomeric seals and the one or more thermoplastic seals from pressure transients of the process fluid.

16. The fluid processing machine of claim 13, further comprising a biasing element configured to bias the sealing armature along the axial degree of freedom toward the projection.

17. A method for sealing, the method comprising:
    rotating the shaft of the fluid processing machine of claim 1 about the axis;
    sealing, via the dynamic rotational seal, between the shaft and the sealing armature, wherein the sealing armature does not rotate with the shaft; and
    sealing, via the dynamic axial seal, between the sealing armature and the frame of the fluid processing machine.

18. The method of claim 17, comprising biasing the sealing armature toward the shaft.

19. The method of claim 17, wherein the one or more metallic seals comprise a continuous ring or a spiral split ring, or both.

20. The method of claim 17, wherein the dynamic axial seal further comprises one or more thermoplastic seals.

* * * * *